US010662323B2

United States Patent
Ho et al.

(10) Patent No.: US 10,662,323 B2
(45) Date of Patent: May 26, 2020

(54) THERMOPLASTIC BLEND FORMULATIONS FOR CABLE INSULATIONS

(71) Applicant: NKT HV CABLES AB, Lyckeby (CH)

(72) Inventors: Chau-Hon Ho, Lörrach (DE); Cherif Ghoul, Raleigh, NC (US); Gustavo Dominguez, Montevideo (UY); Anneli Jedenmalm, Stockholm (SE); Andreas Friberg, Sundbyberg (SE); Andrej Krivda, Wettingen (CH); Lei Xie, Mellingen (CH); Andreas Farkas, Stenungsund (SE)

(73) Assignee: NKT HV CABLES AB, Lyckeby (SE)

( * ) Notice: Subject to any disclaimer, the term of this patent is extended or adjusted under 35 U.S.C. 154(b) by 40 days.

(21) Appl. No.: 14/911,674

(22) PCT Filed: Aug. 12, 2013

(86) PCT No.: PCT/EP2013/066790
§ 371 (c)(1),
(2) Date: Feb. 11, 2016

(87) PCT Pub. No.: WO2015/022004
PCT Pub. Date: Feb. 19, 2015

(65) Prior Publication Data
US 2016/0194489 A1 Jul. 7, 2016

(51) Int. Cl.
*C08L 23/20* (2006.01)
*C08L 23/16* (2006.01)
(Continued)

(52) U.S. Cl.
CPC ............. *C08L 23/20* (2013.01); *C08L 23/142* (2013.01); *C08L 23/16* (2013.01); *H01B 3/441* (2013.01);
(Continued)

(58) Field of Classification Search
CPC ...... C08L 23/20; C08L 23/16; C08L 2205/03; C08L 2203/202; C08L 2205/02; H01B 3/441
See application file for complete search history.

(56) References Cited

U.S. PATENT DOCUMENTS

| 2006/0124341 A1 | 6/2006 | Perego et al. |
| 2007/0134506 A1 | 6/2007 | Chasey et al. |
| (Continued) | | |

FOREIGN PATENT DOCUMENTS

| EP | 0 110 677 A1 | 6/1984 |
| EP | 0 893 801 A1 | 1/1999 |
| (Continued) | | |

OTHER PUBLICATIONS

Alemán, "Definitions of Terms Relating to the Structure and Processing of Sols, Gels, Networks, and Inorganic-Organic Hybrid Materials", (IUPAC Recommendations 2007), Pure Appl. Chem., 2007, vol. 79, No. 10, pp. 1801-1829, see p. 1817.
(Continued)

*Primary Examiner* — Samir Shah
(74) *Attorney, Agent, or Firm* — Birch, Stewart, Kolasch & Birch, LLP

(57) ABSTRACT

The present invention relates to a polymer composition suitable for the manufacture of an electrical insulation layer for cables having superior mechanical and electrical properties and being environmentally friendly, to a cable comprising said polymer composition as well as to the use of the polymer composition as an electrical insulation layer in cables.

30 Claims, 7 Drawing Sheets

(51) Int. Cl.
*H01B 3/44* (2006.01)
*C08L 23/14* (2006.01)

(52) U.S. Cl.
CPC ..... *C08L 2203/202* (2013.01); *C08L 2205/02* (2013.01); *C08L 2205/03* (2013.01)

(56) References Cited

U.S. PATENT DOCUMENTS

| | | | |
|---|---|---|---|
| 2008/0093104 A1* | 4/2008 | Gahleitner | C08L 23/04 174/110 SR |
| 2009/0211782 A1 | 8/2009 | Perego et al. | |
| 2009/0297106 A1* | 12/2009 | Pizzorno | G02B 6/4494 385/109 |
| 2010/0122833 A1 | 5/2010 | Han et al. | |
| 2010/0163269 A1 | 7/2010 | Perego et al. | |
| 2011/0266027 A1 | 11/2011 | Pham et al. | |
| 2013/0041080 A1* | 2/2013 | Kamiya | C08L 23/0869 524/133 |

FOREIGN PATENT DOCUMENTS

| | | |
|---|---|---|
| EP | 0 893 802 A1 | 1/1999 |
| EP | 1 619 217 A1 | 1/2006 |
| EP | 1 741 747 A1 | 1/2007 |
| EP | 1 820 821 A1 | 8/2007 |
| EP | 2 182 524 A1 | 5/2010 |
| EP | 2 182 525 A1 | 5/2010 |
| EP | 2 182 526 A1 | 5/2010 |
| JP | 51-50344 | 5/1976 |
| JP | 57-115441 A | 7/1982 |
| JP | 8-7671 A | 1/1996 |
| JP | 2000-285743 A | 10/2000 |
| JP | 2005-268047 A | 9/2005 |
| JP | 3835048 B2 | 10/2006 |
| JP | 2009-200003 A | 9/2009 |
| WO | WO 00/41187 A1 | 7/2000 |
| WO | WO 02/03398 A1 | 1/2002 |
| WO | WO 02/13204 A1 | 2/2002 |
| WO | WO 02/27731 A1 | 4/2002 |
| WO | WO 2004/066317 A1 | 8/2004 |
| WO | WO 2005/055250 A1 | 6/2005 |
| WO | WO 2007/048422 A1 | 5/2007 |
| WO | WO 2008/058572 A1 | 5/2008 |
| WO | WO 2010/076231 A1 | 7/2010 |
| WO | WO 2010/076242 A1 | 7/2010 |
| WO | WO 2011/080151 A1 | 7/2011 |
| WO | WO 2011/092533 A1 | 8/2011 |
| WO | WO 2011/113685 A1 | 9/2011 |
| WO | WO 2011/132656 A1 | 10/2011 |
| WO | WO2011132656 * | 10/2011 |

OTHER PUBLICATIONS

Farkas et al., "Development of High Performance Polymeric Materials for HVDC Cables", 8th International Conference on Insulated Power Cables, Jicable'11, Jun. 19-23, 2011, Versailles—France, 6 pages.

Hussin et al., "Space Charge Accumulation and Conductivity of Crosslinking Byproducts Soaked LDPE", IEEE, 2010, 2010 Annual Report Conference on Electrical Insulation and Dielectric Phenomena, 4 pages.

Polymer Blend, IUPAC Compendium of Chemical Terminology, Gold Book online, 1997, doi:10.1351/goldbook.P04736.

Shanks et al., "Polypropylene-polyethylene blend morphology controlled by time-temperature-miscibility", Elsevier, Polymer, 2000, vol. 41, pp. 2133-2139.

Zhu et al., "Electrical Properties of Silane Crosslinked Polyethylene in Comparison with DCP Crosslinked Polyethylene", IEEE Transactions on Dielectrics and Electrical Insulation, Apr. 1999, vol. 6, No. 2, pp. 164-168.

* cited by examiner 2a                                    2b 2c                                    2d 2e 2f 2g 2h
2i 2j
2k

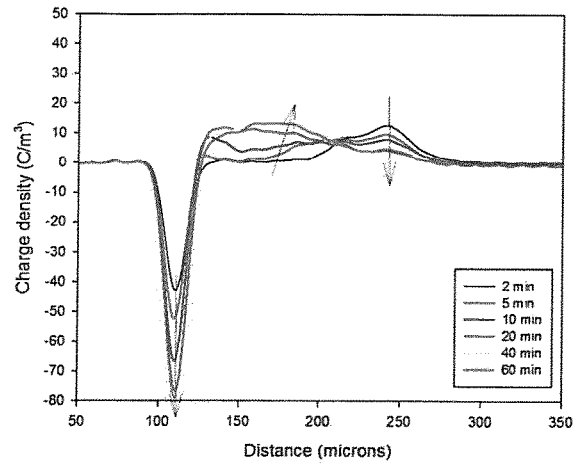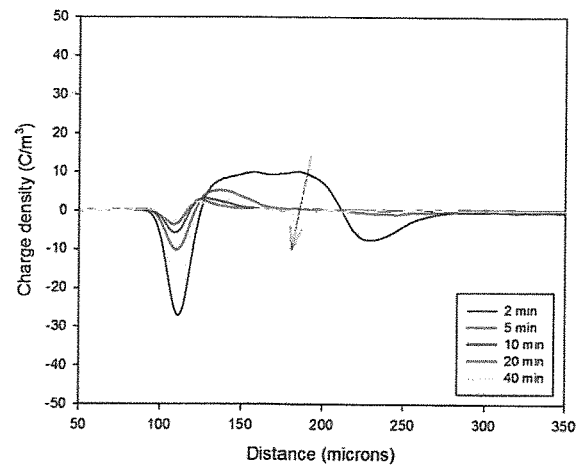
3a
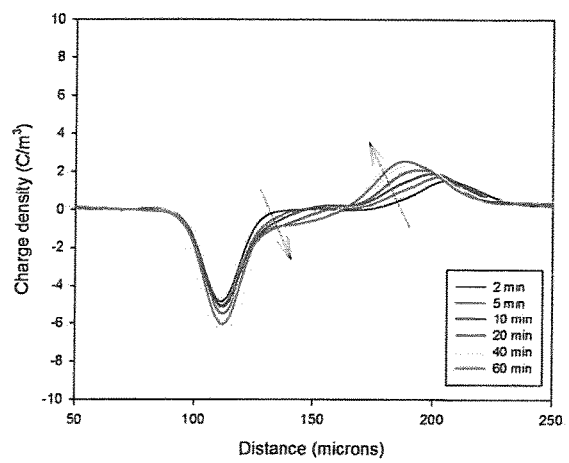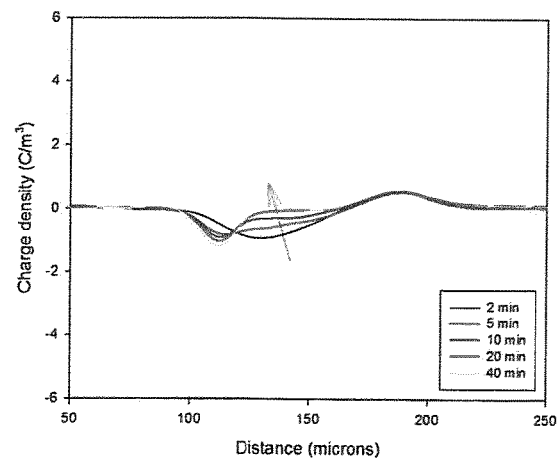
3b
Figures 3a and 3b

3c

3d

3e

3f

THERMOPLASTIC BLEND FORMULATIONS FOR CABLE INSULATIONS

The present invention relates to a polymer composition suitable for the manufacture of an electrical insulation layer—in particular for the manufacture of insulation layers for cables—having superior mechanical and electrical properties and being environmentally friendly. Moreover, the present invention is also directed to a process for producing the insulation layer, and to the use of the polymer composition as an electrical insulation layer. Further, the present invention refers to a cable comprising the insulation layer made of the inventive polymer composition as well as to a process for the manufacture of the cable comprising the invented polymer composition in the form of one or more insulation layer(s). Also, the present invention is concerned with the use of the polymer composition for low, medium and/or high voltage (HV) insulations as well as for both direct current (DC) or alternating current (AC) transmission or distribution.

STATE OF THE ART

Metallic conductors or semi-conductive substrates used in power cables—hereinafter cables—and other electrical devices are electrically insulated by extruding insulating materials over the metallic conductor or the semi-conductive substrate. In this regard, a power cable is generally understood to be a cable which is able to transmit a power above 100 MW. Moreover, a voltage above 35 kV is generally understood to be a high voltage. A voltage below 35 kV and above 1 kV is generally understood to be a medium voltage. Accordingly, a voltage below 1 kV is generally understood to be a low voltage. A semi-conductive sheathing material is understood to be a material whose conductivity is above $10^{-8}$ S/m at 20° C. Thus, the term semi-conductive includes conductive materials of conductivities as high as, e.g., $10^8$ S/m. In particular, semi-conductive materials have a conductivity of more than $10^{-5}$ S/m, e.g. between $10^{-5}$ S/m and $10^{-4}$ S/m at 20° C.

As insulating materials, polymeric materials such as ethylene or propylene polymers, copolymers such as propylene-ethylene co-polymers, as well as diene terpolymers (EPDM) having a polyethylene-type crystallinity have been utilized. Particularly ethylene polymers have been used as insulation and semiconducting shields due to an easy processability and their beneficial electrical properties. For instance, standard MV and HV cables are commonly operated at about 70° C. for DC transmissions and at up to 90° C. for AC transmissions.

However, although the above-mentioned standard polymeric materials show sufficient insulating properties for low and medium voltage cables, they have several drawbacks when being used in high voltage cables.

For insulating high voltage cables, polymeric materials are desired which exhibit a high melting point since an increased power transmission (as it is the case in high voltage cables) leads to an increase of operating temperatures which may lead to softening or even melting of the insulation material. At the same time, similar to low and medium voltage cables, high voltage cables also require high flexibility for a better mechanical handling of the cable. In particular, when rolled and stored on a large cable drum usual tensile deformations of up to 5% are applied on large HV cables. Therefore, no permanent plastic deformation and yielding should occur up to 5% deformation and linear elasticity with linear stress-strain behaviour is required.

However, the above-mentioned standard polymeric materials either have a high melting point or a low elastic modulus since, for the same type of polymer, a higher melting temperature is generally correlated with a higher crystallinity and/or higher intermolecular interactions and therefore with higher rigidity, i.e. a decreased flexibility. This is for instance the case for high density polyethylene (HDPE) or i-PP which have a high melting/softening point (onset) of 145° C. and 165° C., respectively, while, at the same time, both HDPE and i-PP have a rather high Young's modulus of more than 1.0 GPa and 1.5 GPa, respectively, and are therefore very rigid to be used for large HV cables. Furthermore, HDPE and i-PP have a low limit of linear elasticity at 1-2% deformation. In view of the above, it becomes evident that standard polymeric materials do not meet the mechanical properties desired for high voltage cables.

An option as cable insulation for high voltage cables are cross-linked polyethylene materials which provide a satisfactory mechanical performance even under heating in continuous use and under conditions of current overload while at the same time maintain a high level of flexibility. In this regard, cross-linked low-density polyethylene (LDPE) (abbreviation: XLPE or PEX) fulfills the high flexibility requirements for high voltage cables with a Young's modulus of lower than 200 MPa and linear elasticity limit of 12-14%. Accordingly, XLPE is widely used in the state of the art as insulation material for high voltage cables.

However, cross-linking of polyethylene (in order to obtain XLPE) is carried out during extrusion in the cable manufacturing process for example by using dicumyl peroxide (DCP). This modification is required in order to improve thermo-mechanical properties since LDPE has a rather low melting point of around 115° C. With XLPE, it is possible to achieve a rated maximum conductor temperature of 90° C. and a 250° C. short circuit rating—as required for standard HVAC applications while at the same time maintaining a low modulus of 0.1-0.2 GPa.

The drawback of DCP cross-linked polyethylene is the generation of polar volatile by-products. However, as shown by Yutao, Z.; Ho Gyu, Y.; Suh, K. S. Dielectrics and Electrical Insulation, IEEE Transactions on 1999, 6, 164-168 and Farkas, A.; Olsson, C. O.; Dominguez, G.; Englund, V.; Hagstrand, P.-O.; Nilsson, U. H. Development of high performance polymeric materials for HVDC cables; 2011 8th International Conference on Insulated Power Cables, Jicable 2011, such polar by-products derived from DCP increase the conductivity of the insulating material. In particular, these species impair electrical insulation properties such as space charge behaviour at very high voltages and limit the use as insulation material. Particularly for DC applications used in voltage ranges higher than 320 kV, low electrical conductivity is crucial in order to avoid thermal runaway effect and pre-mature breakdown as shown by Nussin, N.; Chen, G.; space charge accumulation and conductivity of crosslinking byproducts soaked LDPE; Electrical Insulation and Dielectric Phenomena (CEIDP): 2010 Annual Report Conference, 17-20 Oct. 2010, 1-4.

A further disadvantage of XLPEs is that cross-linked products are generally difficult to recycle. Namely, should the cable have reached the end of its operational lifetime, this results in the whole cable having to be disposed of.

In view of the above, it is an object of the present invention to overcome the above-discussed disadvantages and to provide a thermoplastic composition, particularly for use as an insulation layer for medium and high voltage cables that have both high thermal form stability and high mechanical stability, as well as low conductivity and high electrical break down strength, and which at the same time does not exhibit the drawbacks of XLPEs.

DESCRIPTION OF THE INVENTION

As a result of intensive studies conducted taking the above described problems into consideration, the present inventors were surprised to find that in mixing a first copolymer being an ethylene-propylene copolymer and having a specific ethylene/propylene ratio and a copolymer blend comprising a second copolymer being a butylene-propylene copolymer and having a specific butylene/propylene ratio, a polymer composition is provided which exhibits superior mechanical and electrical properties, such as high thermal form-stability and mechanical flexibility, as well as low conductivity and high electric breakdown strength and which is usable for insulation of electric cables, especially HV DC cables.

The present invention refers to a polymer composition comprising
  a first copolymer being an ethylene-propylene copolymer comprising from 60 to 95% by weight propylene and from 5 to 40% by weight ethylene, based on the total weight of the first copolymer, and
  a copolymer blend comprising a second copolymer being a butylene-propylene copolymer, wherein
  the second copolymer comprises from 15 to 35% by weight 1-butylene and from 30 to 65% by weight propylene, based on the total weight of the second copolymer,
wherein
the weight ratio of the first copolymer to the copolymer blend ranges from 90:10 to 10:90,
wherein
the polymer composition has a softening temperature according to the Vicat method based on ASTM-D1525 of more than 120° C. and a Young's modulus determined according to ISO 527-2 of less than 500 MPa, and wherein the polymer composition has DC electrical breakdown strength at room temperature of higher than 300 kV/mm, particularly higher than 350 kV/mm, determined according to ASTM D149-87 on 0.1 mm thick plates measured in silicone oil HVDC source with a voltage ramping rate of 100 V/s.

According to an aspect, the first copolymer is different from the second copolymer.

The inventive polymer composition has an overall polyolefin character like HDPE or i-PP exhibiting a high melting temperature but—compared to neat HDPE and i-PP—a much reduced stiffness with a lower Young's modulus and much increased linear elasticity limit. Furthermore, the blend exhibits superior electrical properties such as low conductivity, high breakdown strength and good space charge behavior attributable to the absence of phase separation.

Moreover, in contrast to other "flexibilized multi-component compositions" the inventive polymer composition exhibits an extremely high compatibility of the applied base polymers (i.e. the first copolymer and the copolymer blend) resulting in a highly homogenous material. Therefore, any phase separation as observed widely for other "flexibilized multi-component compositions" does not occur after cooling from molten state—even at very low cooling rates. Nevertheless, breakdown strength improved at even lower cooling rates with absence of phase separation.

This is highly unexpected since thermoplastic polymer blends (such as "flexibilized multi component compositions") typically suffer from incompatibility of the components and micro-scale phase separation phenomena which may dramatically impair the material properties—in particular electrical breakdown strength.

The inventive polymer composition comprising the above-mentioned blend stands out with superior mechanical and electrical properties such as high thermal form-stability and mechanical flexibility as well as low conductivity and high electric breakdown strength and is highly usable for insulation of electric cables, in particular HV cables, in particular for HV DC cables.

In the following, if not otherwise defined, "% by weight" refers to the total weight of the respective entity (e.g. the total weight of the first copolymer, the total weight of the second copolymer, the total weight of the copolymer blend or the total weight of the polymer composition). Furthermore, if not otherwise stated, all measurements were carried out at room temperature.

BRIEF DESCRIPTION OF THE FIGURES

The details will be described in the following with reference to the figures.

FIGS. 3a-3f show measurements/graphs (charging left, decay right) concerning space charge measurements of Versify 2200® (3a), Versify 3000® (3b), SC820CF® (3c), SC820CF/Tafmer PN3560® in a ratio of 70:30 (3d), i-PP/Tafmer PN3560® in a ratio of 70:30 (3e), and i-PP/Versify 2200® in a ratio of 70:30 (3f). Data with respect to Tafmer PN3560® alone as well as i-PP/Versify 3000® in a ratio of 70:30 were not measurable.

DETAILED DESCRIPTION OF ASPECTS OF THE PRESENT INVENTION

Figure 1:
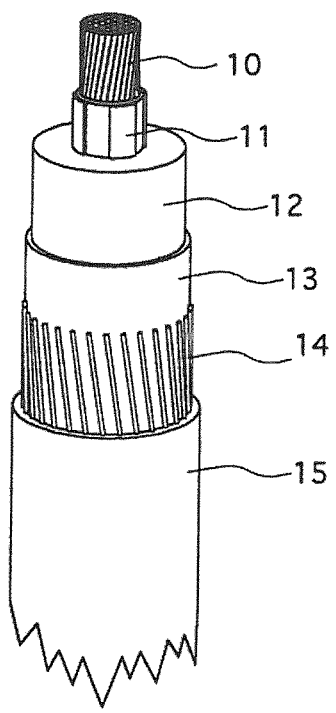
FIG. 1 is an example of a cable structure according to the present invention.

Reference will now be made in detail to various aspects of the invention and embodiments. Each aspect is provided by way of explanation and is not meant as a limitation. For example, features illustrated or described as part of one aspect or embodiment can be used on or in conjunction with any other aspect or embodiment to yield yet a further aspect or embodiment. It is intended that the present disclosure includes any such combinations and variations.

First Copolymer

According to an aspect, the first copolymer being an ethylene-propylene copolymer comprises from 60 to 95% by weight, preferably from 70 to 90% by weight, most preferably from 80 to 89% by weight propylene, and from 5 to 40% by weight, more preferably from 10 to 30% by weight, most preferably from 11 to 20% by weight ethylene, based on the total weight of the first ethylene-propylene copolymer. With this architecture a polymer with a sufficiently high melting/softening point but reduced stiffness is obtained. Without being bound to any theory, it is understood that the first copolymer according to the present invention exhibits continuously linked crystalline bridges within an amorphous matrix. It is understood that this structure within the ethylene-propylene copolymer plays an essential part in the generation of the nanostructure as well as the formation of a homogeneous phase within the polymer composition when being blended with the copolymer blend.

For the purpose of this application, an ethylene-propylene copolymer comprising "propylene" is understood to be an ethylene-propylene copolymer which comprises "monomer units derivable from propylene". According definitions apply for other monomers, e.g. "ethylene" monomer units or "butylene" monomer units.

In a preferred aspect of the present invention, the first copolymer consists of ethylene and propylene, preferably from 60 to 95% by weight, preferably from 70 to 90% by weight, most preferably from 80 to 89% by weight propylene, and from 5 to 40% by weight, more preferably from 10% to 30% by weight, most preferably from 11 to 20% by weight ethylene, based on the total weight of the ethylene-propylene copolymer.

The inventors unexpectedly found out that the ethylene-propylene ratio, the average block lengths (of ethylene and propylene) as well as the overall content of EPE and PEP units (single monomer inclusions) within the first copolymer strongly influence both the compatibility with the copolymer blend within the final polymer composition and the flexibility of the final polymer composition due to an effect on the overall crystallinity. With respect to the latter, it was found out that largely increasing the propylene content in the first copolymer (to >60% by weight) enhances the compatibility with the copolymer blend while maintaining a high melting/softening point, i.e. an i-PP like behaviour. However, the incorporation of ethylene is crucial for disrupting the lamella formation and polymer chain order which leads to a lower crystallinity and, therefore, to a high flexibility.

In particular, the inventors found out that if the ethylene content within the inventive first copolymer is too high (i.e. higher than 40% by weight), this may result in a liquid-liquid phase separation as mentioned above where the final structure will tend to look like a i-PP with an array of micro-scale droplets of the rubbery ethylene-rich phase. Another possibility is the occurrence of liquid-solid phase separation especially under slow cooling from the hot molten state where the difference in crystallization speeds of the two or more "incompatible" polymer parts appear highest.

Accordingly, if the propylene content within the inventive first copolymer is too high (i.e. higher than 95% by weight)—logically resulting in long propylene blocks—the first copolymer tends to behave like conventional i-PP. Small ethylene units will tend to be incorporated into the polypropylene phase such that also the final blend looks structurally very much like i-PP, with no distinct dispersed "rubbery" phase. Therefore, no benefit of increased flexibility will be achieved. Additionally, the existence of such larger propylene blocks leads to micro-scale phase separation as mentioned above for classic block-copolymers.

Therefore, to ensure sufficient compatibility with neither liquid-liquid nor liquid-solid phase separation, the first copolymer preferably contains propylene in a content within the above-mentioned ranges, most preferably 87% by weight, preferably with propylene blocks of 8.2 monomer units length on average. Accordingly, to ensure sufficient flexibility and amorphousness, the first copolymer preferably contains ethylene in a content within the above-mentioned ranges, most preferably 13% by weight, preferably with short ethylene blocks of 1.2 monomer units length on average.

According to an aspect, the first copolymer has an overall proportion of ethylene-propylene-ethylene (EPE) and propylene-ethylene-propylene (PEP) units of 10 to 20% on average, preferably 11 to 18%, more preferably 14 to 16%, based on the total number of triades present in the first copolymer. In this respect, the inventors found out that a high content of single monomer inclusions such as EPE and PEP units within the above-mentioned ranges increases the possibility of chain order disruption in the crystalline lamellae and therefore decrease of overall crystallinity.

Further, the inventors found out that the structure and molecular architecture of the first ethylene-propylene copolymer has strong influence on the prevention of the above and below described phase separation phenomena between the first copolymer when being blended with the copolymer blend. Accordingly, the specific distribution of ethylene and propylene units within the first copolymer contributes to the absence of phase separation when being blended with the copolymer blend.

This can be seen by the copolymer architecture of the first copolymer determined by $^{13}$C-NMR. Accordingly, samples of the first copolymer are dissolved in 1,2,4-trichloro benzene (TCB) and tetrachloro ethylene D6 (TCE-d6) and measured at 120° C. The copolymer architecture reveals the following aspects of the first copolymer: the average ethylene (E) block length, the average propylene (P) block length, the distribution of diades with respect to propylene-propylene units (PP), ethylene-propylene units (EP), ethylene-ethylene units (EE), the distribution of triades with respect to propylene-propylene-propylene units (PPP), propylene-propylene-ethylene units (PPE), ethylene-propylene-ethylene units (EPE), propylene-ethylene-propylene units (PEP), ethylene-ethylene-ethylene units (EEE) and ethylene-ethylene-propylene units (EEP).

For the purpose of this application the above-mentioned average ethylene (E) block length refers to the number of monomers (ethylene units) which are present per continuous ethylene block on average within the first copolymer. According definition applies for the average propylene (P) block length For instance, in case the average ethylene block length is 8.0 monomer units, this may result from e.g. ethylene blocks within the whole first copolymer, of which one third consists of 7 ethylene monomers, another third consist of 8 ethylene monomers and another third consists of 9 ethylene monomers.

For the purpose of this application the above-mentioned proportions of diades/triades are based on the total number of diades/triades present in the first copolymer. In general, a copolymer consisting of n monomers exhibits n-1 diades and n-2 triades. For instance, a copolymer consisting of 1001 monomers exhibits 1000 diades. In case 200 diades consist of propylene-propylene, 200 diades consist of ethylene-propylene and 100 diades consist of ethylene-ethylene, the proportion of propylene-propylene diades is 40%, the proportion of ethylene-propylene diades is 40% and the proportion of ethylene-ethylene diades is 20%. Similar considerations apply for triades.

According to an aspect the first copolymer has an average polyethylene block length of 1.0 to 1.5 monomer units, more preferably 1.1 to 1.4 monomer units, most preferably 1.2 to 1.3 monomer units.

According to an aspect the first copolymer has an average polypropylene block length of 5.0 to 10.0 monomer units, more preferably 5.5 to 9.0 monomer units, most preferably 6.0 to 8.5 monomer units.

According to an aspect the first copolymer has a proportion of propylene-propylene diades of 60% to 79%, more preferably 63% to 78%, most preferably 65% to 77% based on the total number of diades present in the first copolymer.

According to an aspect the first copolymer has a proportion of ethylene-propylene diades of 16% to 30%, more preferably 18% to 29%, most preferably 20% to 28% based on the total number of diades present in the first copolymer.

According to an aspect the first copolymer has a proportion of ethylene-ethylene diades of 1% to 4.5%, more preferably 1.5% to 4.3%, most preferably 2% to 4% based on the total number of diades present in the first copolymer.

According to an aspect the first copolymer has a proportion of propylene-propylene-propylene triades of 50% to 70%, more preferably 55% to 68%, most preferably 60% to 66% based on the total number of triades present in the first copolymer.

According to an aspect the first copolymer has a proportion of propylene-propylene-ethylene triades of 12% to 25%, more preferably 13% to 22%, most preferably 14% to 20% based on the total number of triades present in the first copolymer.

According to an aspect the first copolymer has a proportion of ethylene-propylene-ethylene triades of 4% to 20%, more preferably 5% to 10%, most preferably 6% to 8% based on the total number of triades present in the first copolymer.

According to an aspect the first copolymer has a proportion of propylene-ethylene-propylene triades 6% to 20%, more preferably 7% to 15%, most preferably 8% to 10% based on the total number of triades present in the first copolymer.

According to an aspect the first copolymer has a proportion of ethylene-ethylene-propylene triades of 1% to 10%, more preferably 2% to 8%, most preferably 3% to 6% based on the total number of triades present in the first copolymer.

According to an aspect the first copolymer has a proportion of ethylene-ethylene-ethylene triades of 0.1% to 2%, more preferably 0.2% to 1%, most preferably 0.3% to 0.6% based on the total number of triades present in the first copolymer.

According to an aspect the first copolymer has a crystallinity of 10% to 40%, more preferably 15% to 30%, most preferably 20% to 28%. The crystallinity degree of the first copolymer is determined as ratio of the measured melting enthalpy (via DSC) and the theoretical melting enthalpy of a perfect i-PP crystal (=207.1 J/g).

According to an aspect the first copolymer has a weight average molecular weight $M_w$ of 150,000 g/mol to 500,000 g/mol, more preferably 180.000 g/mol to 400.000 g/mol, most preferably 200.000 to 300.000 g/mol. Accordingly, the first copolymer has a number average molecular weight $M_n$ of 20,000 g/mol to 130,000 g/mol, more preferably 30.000 g/mol to 120.000 g/mol, most preferably 50.000 g/mol to 80.000 g/mol. Furthermore, the z-average molecular weight $M_z$ of the first copolymer is 300,000 g/mol to 700,000 g/mol, more preferably 400.000 to 650.000 g/mol, most preferably 500.000 to 600.000 g/mol. Preferably, the poly dispersity PD (defined as $M_w/M_n$) ranges from 1.2 to 25, more preferably from 1.5 to 13, most preferably from 2.5 to 6, particularly from 3.0 to 4.0. The above-mentioned molecular weights are measured via high temperature gel permeation chromatography (HT-GPC) at 150° C. using 1,2,4-trichloro benzene (TCB) as eluent and polystyrene as calibration standards.

According to an aspect the first copolymer shows no phase separation occurrence determined via visual inspection, polarized microscopy, atomic force microscopy (AFM) and scanning electron microscopy (SEM) or a combination of one or more of these techniques. The definition and the determination of phase separation is described in more detail below with regard to the polymer composition.

According to an aspect the first copolymer has a Young's modulus (i.e. elastic modulus) of 200 MPa to 800 MPa, more preferably 300 MPa to 700 MPa, most preferably 400 MPa to 600 MPa. The Young's modulus (elastic modulus) is determined according to ISO 527-2 at room temperature (25° C.). In particular, the Young's modulus is determined from the slope of a stress-strain curve created during tensile tests ISO 527-2 conducted on a sample of the copolymer. According to a preferred aspect, the above Young's modulus is obtained at all temperatures between 10° C. to 80° C.

According to an aspect the first copolymer has a softening temperature of higher than 120° C., preferably higher than 130° C., more preferably higher than 140° C. According to a further aspect, the first copolymer has a softening temperature of 120° C. to 200° C., preferably 130° C. to 180° C., more preferably 140° C. to 150° C. The softening temperature is defined as the temperature at which a material softens beyond some arbitrary softness. It can be determined, for instance, by the Vicat method based on ASTM-D1525 (or, in an alternative or additional aspect, based on ISO 306). In particular, the softening temperature is determined via thermal mechanical analysis (TMA) using a quartz probe with a flat tip (1 mm diameter) pressed on a sample (preferably 5×5 mm) with a constant load of 100-5000 mN (preferably 100 mN) and a temperature rate of 0.5 to 10 K/min (preferably 1 K/min) under air environment. During continuous heating of the sample, the quartz probe caves in (penetrates) the sample until the quartz probe reaches the bottom of the sample.

According to an aspect the first copolymer has a steady state conductivity (DC) of less than $1*10^{-12}$ S/m, preferably of less than $2*10^{-13}$ S/m, and more preferably of less than $2.5*10^{-14}$ S/m. In a preferred aspect, the first copolymer has a steady state conductivity (DC) of $1*10^{-15}$ S/m to $1.5*10^{-14}$ S/m, preferably $1.5*10^{-15}$ S/m to $1.0*10^{-14}$ S/m S/m more preferably $2*10^{-15}$ S/m to $5*10^{-15}$ S/m. The steady state conductivity (DC) is by applying a three electrode system (40 mm round electrode diameter with guard electrode) and measuring the leakage current with a sensitive picoamperemeter (Keithley 6485) on 1 mm thick plates at 70° C. and 20 kV/mm DC after at least 80 hours.

According to an aspect the first copolymer has an electrical breakdown strength (DC) of higher than 300 kV/mm, preferably higher than 350 kV/mm more preferably higher than 400 kV/mm at any cooling rate. In this respect, electrical breakdown refers to a rapid reduction in the resistance of an electrical insulator that can lead to a spark jumping around or through the insulator. The electrical breakdown strength (DC) is determined according to ASTM D149-87 at room temperature on 0.1 mm thick plates (18×18 cm) manufactured in a hot press and measured in silicone oil using a 100 kV digital HVDC source with a voltage ramping rate of 100 V/s.

According to another aspect of the invention, the first copolymer is non-cross-linked. This leads to several favorable effects. In particular, the use of a copolymer which is non-cross-linked results in shorter production times (due to less process steps) and the possibility to recycle the cable having reached the end of its operational lifetime. Further, no scorch phenomena occur and the risk of inhomogeneity (between the individual components of the final insulation layer) is lowered since no exothermic cross-linking reactions have been carried out. Moreover, due to absence of volatile by-products (usually generated during cross-linking), high voltage ratings, low conductivity values are achieved, and, no degassing is required. Further, due to the fact that less additives are required, a smaller number of compounds has to be adjusted to each other and the complexity of the insulation system is reduced. Hence, a higher compatibility with other materials such as semicon layers is to be expected.

Optionally, the first copolymer comprises less than 10%, more preferably from 0.1 to 8%, most preferably from 1 to 5% by weight of a further polymer. Said further polymer can be represented by any other polymer, copolymer, terpolymer or polymer mixture. Preferably, further polymers are so-called ethylene propylene diene terpolymer rubbers (EPDM). Therein, the diene comonomer has preferably from 4 to 20 carbon atoms. Said diene copolymer is preferably selected from: linear or branched, conjugated or non-conjugated diolefins. Preferably, diene copolymers are 1,3-butadiene, 1,4-hexadiene or 1,6-octadiene, monocyclic or polycyclic dienes, such as 1,4-cyclohexadiene, 5-ethylidene-2-norbornene, 5-methylene-2-norbornene.

According to a specific aspect of the invention, the first copolymer is SC820CF® (i.e. Bormed SC820CF® from Borealis) or a copolymer with similar properties, in particular a similar ethylene propylene weight ratio (i.e. any of the ratios mentioned herein). According to a particular aspect, the first copolymer leads to a similar architecture within the polymer composition as it is the case for SC820CF® (e.g. similar average ethylene (E) block length, or similar average propylene (P) block length within the polymer composition).

Specifically, according to an aspect, the average ethylene and/or propylene block length (defined in monomer units) of the first copolymer differ in average by less than 50% or even less than 20% from average ethylene and/or propylene (PP) block length (defined in monomer units) of SC820CF® but that is analogous in every other respect.

Copolymer Blend

According to an aspect, the copolymer blend is understood to be a blend of at least one copolymer and one further component which is a polymer. According to an aspect, the copolymer blend comprises a second copolymer. According to a further aspect the copolymer blend comprises from 10 to 99.99% by weight, preferably from 40 to 95% by weight, more preferably from 75 to 90% by weight of the second copolymer, based on the total weight of the copolymer blend. According to an aspect, the second copolymer is a butylene-propylene copolymer. Therefore, according to an aspect, the second copolymer comprises butylene (preferably 1-butylene) and propylene. According to a further preferred aspect, the second copolymer comprises butylene (preferably 1-butylene), propylene and ethylene. According to a further preferred aspect, the second copolymer of the copolymer blend is different from the first copolymer.

According to an aspect, the second copolymer comprises from 15 to 35% by weight, preferably from 18 to 33% by weight, more preferably from 22 to 30% by weight of 1-butylene, and from 30 to 65% by weight, preferably from 35 to 60% by weight, more preferably from 45 to 55% by weight propylene, based on the total weight of the second copolymer.

According to an aspect, the second copolymer further comprises from 15 to 35% by weight, preferably from 18 to 30% by weight, more preferably from 20 to 28% by weight ethylene, based on the total weight of the second copolymer. In a preferred aspect, the 1-butylene, propylene and ethylene contents within the second copolymer add up to 95% weight, preferably up to about 100% by weight. In a further preferred aspect of the present invention, the second copolymer consists of 1-butylene, propylene and ethylene, preferably from 15 to 35% by weight, more preferably from 18 to 33% by weight, most preferably from 22 to 30% by weight of 1-butylene, preferably from 30 to 65% by weight, more preferably from 35 to 60% by weight, most preferably from 45 to 55% by weight propylene, and preferably from 15 to 35% by weight, more preferably from 18 to 30% by weight, most preferably from 20 to 28% by weight ethylene, based on the total weight of the second copolymer. Therefore, according to a preferred aspect, the second copolymer is a terpolymer.

According to an aspect, the copolymer blend further comprises an isotactic propylene polymer (i-PP). According to a further preferred aspect, the copolymer blend comprises from 0.01 to 90% by weight, preferably from 5 to 60% by weight, more preferably from 10 to 25% by weight of an isotactic propylene polymer (i-PP).

In a preferred aspect of the present invention, the copolymer blend consists of from 15 to 35% by weight, preferably from 18 to 33% by weight, more preferably from 22 to 30% by weight of 1-butylene, from 30 to 65% by weight, preferably from 35 to 60% by weight, more preferably from 45 to 55% by weight propylene and from 15 to 35% by weight, preferably from 18 to 30% by weight, more preferably from 20 to 28% by weight ethylene. Preferably, the before mentioned 1-butylene, propylene and ethylene monomers form a terpolymer. Apart from this terpolymer, the copolymer blend further consists of from to from 0.01 to 90% by weight, preferably from 5 to 60% by weight, more preferably from 10 to 25% by weight of an isotactic propylene polymer (i-PP), based on the total weight of the copolymer blend.

Optionally, the copolymer blend comprises less than 10%, more preferably from 0.1 to 8%, most preferably from 1 to 5% by weight of a further polymer (apart from the above-mentioned copolymer/polymer).

Said further polymer can be represented by any other polymer, copolymer, terpolymer or polymer mixture. Preferably, further polymers are so-called ethylene propylene diene terpolymer rubbers (EPDM). Therein, the diene comonomer has preferably from 4 to 20 carbon atoms. Said diene copolymer is preferably selected from: linear or branched, conjugated or non-conjugated diolefins. Preferably, diene copolymers are 1,3-butadiene, 1,4-hexadiene or 1,6-octadiene, monocyclic or polycyclic dienes, such as 1,4-cyclohexadiene, 5-ethylidene-2-norbornene, 5-methylene-2-norbornene.

Similar to the considerations as described with regard to the first copolymer, the average block lengths (of butylene and ethylene) as well as the overall monomer distribution within the second copolymer of the copolymer blend are decisive for the overall crystallinity and effect the compatibility of the copolymer blend with the first ethylene-propylene copolymer.

In order to ensure sufficient compatibility with neither liquid-liquid nor liquid-solid phase separation, the second copolymer preferably comprises 1-butylene, propylene, and ethylene units, preferably having butylene blocks of 1.5 monomer units on average between propylene sequences, and, to ensure sufficient flexibility and amorphousness, having short ethylene blocks of 1.4 monomer units on average between propylene sequences.

Similar to the considerations as described with regard to the first copolymer, the structure and molecular architecture of the second copolymer is crucial for the prevention of the above described phase separation phenomena between the copolymer blend when being blended with the first copolymer.

The copolymer architecture of the second copolymer is determined by $^{13}$C-NMR. Accordingly, samples of the second copolymer are dissolved in 1,2,4-trichloro benzene (TCB) and tetrachloro ethylene-$d_6$ (TCE-$d_6$) and measured at 130° C. The copolymer architecture reveals the following aspects of the second copolymer: the average ethylene (E) block length between propylene sequences, the average butylene (B) block length between propylene sequences, the distribution of triades with respect to propylene-propylene-propylene units (PPP), ethylene-propylene-propylene units (EPP), propylene-propylene-ethylene units (PPE), ethylene-propylene-ethylene units (EPE), propylene-ethylene-propylene units (PEP), ethylene-ethylene-ethylene units (EEE), propylene-ethylene-ethylene units (PEE), ethylene-ethylene-propylene units (EEP), ethylene-ethylene-butylene units (EEB), ethylene-butylene-butylene units (EBB), butylene-butylene-ethylene units (BBE), butylene-propylene-propylene units (BPP), propylene-propylene-butylene (PPB) units, butylene-propylene-butylene units (BPB), propylene-butylene-propylene (PBP) units, butylene-butylene-propylene units (BBP), propylene-butylene-butylene units (PBB) and butylene-butylene-butylene units (BBB). The definition of the terms "average ethylene (E) block length" "average propylene (B) block length" and "proportions of triades" is described in more detail above with regard to the second copolymer.

According to an aspect the second copolymer has an average ethylene block length between propylene sequences of 1.0 to 2.0 monomer units, preferably 1.1 to 1.8 monomer units, more preferably 1.3 to 1.6 monomer units.

According to an aspect the second copolymer has an average butylene block length between propylene sequences of 1.0 to 2.0 monomer units, preferably 1.1 to 1.8 monomer units, more preferably 1.3 to 1.6 monomer units.

According to an aspect the second copolymer has a proportion of ethylene-ethylene-ethylene triades of 0.1% to 2%, preferably 0.2% to 1%, more preferably 0.3% to 0.6% based on the total number of triades present in the second copolymer.

According to an aspect the second copolymer has a proportion of ethylene-ethylene-propylene and propylene-ethylene-ethylene triades of 1% to 15%, preferably 2% to 10%, more preferably 4% to 8% based on the total number of triades present in the second copolymer.

According to an aspect the second copolymer has a proportion of propylene-ethylene-propylene triades 6% to 20%, preferably 7% to 15%, more preferably 8% to 12% based on the total number of triades present in the second copolymer.

According to an aspect the second copolymer has a proportion of ethylene-propylene-ethylene triades of 1% to 10%, preferably 1.2% to 5%, more preferably 1.3% to 2% based on the total number of triades present in the second copolymer.

According to an aspect the second copolymer has a proportion of ethylene-propylene-propylene and propylene-propylene-ethylene triades of 5% to 25%, preferably 10% to 22%, more preferably 15% to 20% based on the total number of triades present in the second copolymer.

According to an aspect the second copolymer has a proportion of propylene-propylene-propylene and butylene-propylene-propylene and propylene-propylene-butylene triades of 10% to 50%, preferably 15% to 40%, more preferably 25% to 35% based on the total number of triades present in the second copolymer.

According to an aspect the second copolymer has a proportion of butylene-propylene-butylene triades of 10% to 30%, preferably 15% to 27%, more preferably 20% to 25% based on the total number of triades present in the second copolymer.

According to an aspect the second copolymer blend has a proportion of propylene-butylene-propylene triades of 1% to 8%, preferably 1.5% to 6%, more preferably 2% to 3% based on the total number of triades present in the second copolymer.

According to an aspect the second copolymer has a proportion of butylene-butylene-butylene and butylene-butylene-propylene and propylene-butylene-butylene triades of 1% to 10%, preferably 2% to 8%, more preferably 3% to 5% based on the total number of triades present in the second copolymer.

According to an aspect the second copolymer has a proportion of ethylene-butylene-butylene and butylene-butylene-ethylene triades of 1% to 15%, preferably 2% to 10%, more preferably 3% to 6% based on the total number of triades present in the second copolymer.

According to an aspect the copolymer blend has a crystallinity of 0.1% to 12%, preferably 0.5% to 10%, more preferably 0.5% to 2%. The crystallinity degree of the copolymer blend is determined as ratio of the measured melting enthalpy (via DSC) and the theoretical melting enthalpy of a perfect i-PP crystal (=207.1 J/g).

According to an aspect the copolymer blend has a weight average molecular weight $M_w$ of 300.000 to 500.000 g/mol, preferably 350.000 to 450.000 g/mol, more preferably 390.000 to 410.000 g/mol. Accordingly, the copolymer blend has a number average molecular weight $M_n$ of 100.000 to 200.000 g/mol, preferably 120.000 to 180.000 g/mol, more preferably 150.000 to 170.000 g/mol. The z-average molecular weight $M_z$ of the copolymer blend is 600.000 to 900.000 g/mol, preferably 700.000 to 800.000 g/mol, more preferably 750.000 to 780.000 g/mol. Preferably, the poly dispersity PD (defined as $M_w/M_n$) ranges from 2.2 to 2.8, preferably from 2.3 to 2.7, more preferably from 2.4 to 2.6, particularly from 2.45 to 2.55. The above-mentioned molecular weights are measured via high temperature gel permeation chromatography (HT-GPC) at 150° C. using 1,2,4-trichloro benzene (TCB) as eluent and polystyrene as calibration standards.

According to an aspect the copolymer blend shows no phase separation occurrence determined via visual inspection, polarized microscopy, atomic force microscopy (AFM) and scanning electron microscopy (SEM) or a combination of one or more of these techniques. The definition and the determination of phase separation is described in more detail below with regard to the polymer composition.

According to an aspect the copolymer blend has a Young's modulus (i.e. elastic modulus) of 5 to 50 MPa, preferably 6 to 50 MPa, more preferably 7 to 15 MPa, particularly 8 to 10 MPa. The Young's modulus (elastic modulus) is determined according to ISO 527-2 at room temperature (25° C.). In particular, the Young's modulus is determined from the slope of a stress-strain curve created during tensile tests ISO 527-2 conducted on a sample of the copolymer blend. According to a preferred aspect, the above Young's modulus is obtained at any temperature between 10° C. to 80° C.

According to an aspect the copolymer blend has a softening temperature of higher than 120° C., preferably higher than 130° C., more preferably higher than 140° C. According to a further aspect, the copolymer blend has a softening temperature of 120° C. to 200° C., preferably 130° C. to 180° C., more preferably 140° C. to 150° C. The softening temperature is defined as the temperature at which a material softens beyond some arbitrary softness. It can be determined, for instance, by the Vicat method based on ASTM-D1525 (or, in an alternative or additional aspect, based on ISO 306). In particular, the softening temperature is determined via thermal mechanical analysis (TMA) using a quartz probe with a flat tip (1 mm diameter) pressed on a sample (preferably 5×5 mm) with a constant load of 100-5000 mN (preferably 100 mN) and a temperature rate of 0.5 to 10 K/min (preferably 1 K/min) under air environment. During continuous heating of the sample, the quartz probe caves in (penetrates) the sample until the quartz probe reaches the bottom of the sample.

According to an aspect the copolymer blend has a steady state conductivity (DC) of less than $1*10^{-12}$ S/m, preferably of less than $5*10^{-13}$ S/m, and more preferably of less than $1.5*10^{-13}$ S/m. In a preferred aspect, the copolymer blend has a steady state conductivity (DC) of $1*10^{-14}$ S/m to $2*10^{-13}$ S/m, preferably $5*10^{-14}$ S/m to $1.8*10^{-13}$ S/m S/m more preferably $1.3*10^{-13}$ S/m to $1.5*10^{-13}$ S/m. The steady state conductivity (DC) is determined by applying a three electrode system (40 mm round electrode diameter with guard electrode) and measuring the leakage current with a sensitive picoamperemeter (Keithley 6485) on 1 mm thick plates at 70° C. and 20 kV/mm DC after at least 80 hours.

According to a specific aspect of the invention, the copolymer blend is Tafmer PN3560® (Mitsui) or a copolymer blend with similar properties, in particular a similar compositional structure in a similar weight ratio (i.e. any of the ratios mentioned herein). According to a particular aspect, the copolymer blend leads to a similar architecture within the polymer composition as it is the case for Tafmer PN3560® (Mitsui) (e.g. similar average ethylene (E) block length, or similar average propylene (P) block length within the second copolymer).

Specifically, according to an aspect, the average butylene and/or propylene and/or ethylene block length (defined in monomer units) of the second copolymer differ in average by less than 50% or even less than 20% from the average butylene and/or propylene and/or ethylene block length (defined in monomer units) of Tafmer PN3560® (Mitsui), but that is analogous in every other respect.

According to an aspect, the melt flow rate MFR (230° C., 2.16 kg) of the copolymer blend is preferably 2 to 40 g/10 min, more preferably 4 to 35 g/10 min, most preferably 6 to 32 g/10 min. The MFR is determined by ASTM D1238.

According to an aspect, the density of the copolymer blend is preferably 800 to 900 kg/m³, more preferably 820 to 880 kg/m³, most preferably 850 to 870 kg/m³. The density is determined by ASTM D1505.

According to an aspect, the surface hardness of the copolymer blend is preferably 50 to 100, more preferably 60 to 95, most preferably 65 to 90. The surface hardness is determined by ASTM D2240 (Shore A).

According to an aspect, the melting point (melting temperature) of the copolymer blend is preferably 110 to 190° C., more preferably 120 to 180° C., most preferably 130 to 170° C. The melting point (melting temperature) is determined by differential scanning calorimetry (DSC) according to ISO 11357-1/-3.

According to an aspect, the brittleness temperature of the copolymer blend is preferably −20 to −40° C., more preferably −22 to −35° C., most preferably −25 to −30° C. The brittleness temperature is determined by ASTM D745.

According to an aspect, the elongation at break of the copolymer blend is preferably higher than 600%, more preferably higher than 700%, most preferably higher than 740%. The elongation at break is determined by ASTM D3759/D3759M.

According to an aspect, the permanent set of the copolymer blend is preferably 5 to 25%, more preferably 8 to 20%, most preferably 10 to 18%. The permanent set is determined at a copolymer blend film thickness of 0.3 mm, measured after 150% expansion.

According to an aspect, the compression set (23° C.) of the copolymer blend is preferably 10 to 40%, more preferably 15 to 30%, most preferably 18 to 28%. The compression set (23° C.) is determined at a copolymer blend film thickness of 12 mm, (six-ply 2 mm sheet), at 25% compression and 23° C./24 hr.

According to an aspect, the compression set (70° C.) of the copolymer blend is preferably 40 to 90%, more preferably 50 to 85%, most preferably 55 to 80%. The compression set (70° C.) is determined at a copolymer blend film thickness of 12 mm, (six-ply 2 mm sheet), at 25% compression and 70° C./24 hr.

According to an aspect, the transmittance of the copolymer blend is preferably 80 to 100%, more preferably 90 to 99.5%, most preferably 95 to 99%. The transmittance is determined for a press molding sheet having a thickness of 2 mm (measured in cyclohexal).

According to an aspect, the haze of the copolymer blend is preferably 1 to 12%, more preferably 2 to 10%, most preferably 3 to 8%. The haze is determined for a press molding sheet having a thickness of 2 mm (measured in cyclohexal).

According to an aspect, the copolymer blend is Tafmer PN-3560® or a copolymer with similar properties, in particular a similar blend composition comprising an butylene-propylene copolymer, preferably comprising a terpolymer including 1-butylene, propylene and ethylene copolymer and an isotactic polypropylene in the same or similar weight ratios (i.e. any of the ratios mentioned herein). According to a particular aspect, the copolymer blend leads to similar phase separated domains (in nano scale) in the polymer composition as it is the case for Tafmer PN-3560® (i.e. phase separated domains on a scale of less than 300 nm and/or with an average domain dimension of less than 300 nm).

According to a particular aspect, the copolymer blend leads to a polymer composition having a similar block size and monomer ratio as it is the case for Tafmer PN-3560®. Specifically, according to an aspect, the butylene, propylene and ethylene units of the copolymer blend differ in average size by less than 50% or even less than 20% from the size of the butylene, propylene and ethylene units of Tafmer PN-3560® but that is analogous in every other respect. Additionally or alternatively, the average block alternation frequency (defined as number of boundaries between ethylene and propylene units per length) of the second copolymer differs by less than 50% or even less than 20% from the average block alternation frequency of Tafmer PN-3560® but that is analogous in every other respect. According to another aspect of the invention, the copolymer blend is non-cross-linked.

Weight Ratio of First Copolymer/Copolymer Blend

According to an aspect, the weight ratio of the first copolymer and the copolymer blend preferably ranges from 10:90 to 90:10, preferably 20:80 to 50:50, most preferably from 25:75 to 35:65, particularly 30:70.

Polymer Composition

According to an aspect the polymer composition shows no phase separation occurrence determined via visual inspection, polarized microscopy, atomic force microscopy (AFM) and scanning electron microscopy (SEM) or a combination of one or more of these techniques. For the purpose of this application, phase separation occurrence determined via the above-mentioned techniques is understood to be the separation of two or more distinct phases which are present in a mixture observed at the micro-scale. In this respect, a phase is a region of space within a mixture which can be considered as essentially uniform with regard to its physical properties. More specifically, no separation in different domains, e.g. polymer blend domain and first copolymer domain is observed within a phase. An observation at micro-scale is understood to be obtained from an analytical technique (such as visual inspection, polarized microscopy, atomic force microscopy (AFM) and scanning electron microscopy (SEM)) which analyzes the structure of a material (such as the polymer composition) in a scale above 500 nm, e.g. from 500 nm to 50 µm.

Consequently, the polymer composition exhibits only one single phase throughout the whole polymer composition at the micro-scale. Without being bound to any theory, this single phase within the polymer composition is obtained in that the first copolymer domains behave as macromolecular surfactants and migrate to the interphase separating adjacent the copolymer blend domains. Hence, inhomogeneities at smaller scales are not taken into account. The polymer composition according to the present invention has a heterogeneous nanostructure (i.e. below 500 nm) and exhibit domains having dominating propylene character (blocks) and domains having dominating ethylene character (blocks) leading to a mosaic pattern (checkerboard pattern) at the nano-scale. Preferably, any such domains extend (on average and/or in any direction) to less than 300 nm, more preferably less than 200 nm, most preferably less than 100 nm as determined by atomic force microscopy (AFM) in tapping mode (phase detection). In other words, the polymer composition according to the present invention preferably exhibits phase separated domains on a scale of less than 300 nm, more preferably less than 200 nm, most preferably less than 100 nm as determined by atomic force microcopy (AFM) in tapping mode (phase detection) or scanning electron microscopy (SEM).

In view of commonly used insulating materials, one might conclude that thermoplastic blend mixtures with at least one high melting but stiff component—such as HDPE or i-PP— and one flexible component—e.g. LDPE (E=200-300 MPa) or ethylene copolymer—can be used in order to obtain a suitable insulation material for HV cables. However, as reported in literature by R. A. Shanks, J. Li, L. Yu, Polymer 2000, 41, 2133-2139 polyethylene and isotactic polypropylene are not miscible in the melt stage and their blends suffer from liquid-liquid phase separation. Moreover, the use of block-copolymers consisting of a few but large propylene and ethylene blocks along with other copolymers were also believed to lead to liquid-liquid phase separation similar to blends of i-PP and PE homopolymers. These highly complex issues were taken into consideration by the present inventors.

In particular, commonly used thermoplastic polymer mixtures (thermoplastic blend) comprising two or more distinct polymers typically suffer from incompatibility of the polymers. As a consequence, micro-scale phase separation phenomena occur which may have adverse effects on the properties of the thermoplastic polymer blend. This is owed to the fact that the separated phases present within the polymer blend essentially consist of a polymer material different from that of the whole polymer blend (e.g. a polymer material of only one polymer or of a polymer blend having a distinct blend ratio).

In general, phase separation in a thermoplastic blend upon cooling from molten state can be of liquid-liquid or liquid-solid nature. Blends of two polymers A and B (or more) are generally considered as being miscible or immiscible on the basis of their behaviour in the melt. Liquid-liquid phase separation occurs in case the two polymers A and B are immiscible in the melt at elevated temperature, liquid droplets of one component A are formed within a continuous phase of polymer B resulting into separated nano- to micro-scale islands of A in the polymer B matrix. Liquid-solid phase separation may occur in case the polymers A and B both are likely to be mixed—to some degree—in the hot melt forming a liquid homogenous phase. However, even miscible combinations can phase separate during crystallization, when one component is more readily crystallisable than the other. This part becomes solid first, leaving the less crystallisable in the melt. In other words: if the crystallization speed of polymers A and B are too much apart from each other—due to distinctions in their polymer nature—liquid-solid phase separation is likely to occur leading to the above-mentioned adverse effects. Moreover, liquid-solid phase separation is also dependent on the cooling rate of the melt of the blend. Generally, a lower cooling rate results in a higher risk of liquid-solid phase separation occurrence compared to a higher cooling rate. The above-mentioned considerations also apply for blends with more than two thermoplastic components.

Figure 2A:
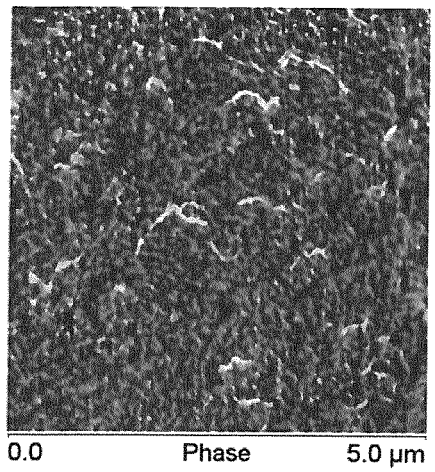
FIGS. 2a-2k show measurements/graphs concerning phase separation occurrence of Tafmer PN3560® (2a), Versify 2200® (2b), Versify 3000® (2c), SC820CF® (2d), SC820CF/Tafmer PN3560® in a ratio of 70:30 (2e-2g), i-PP/Tafmer PN3560® in a ratio of 70:30 (2h-2i), i-PP/Versify 2200® in a ratio of 70:30 (2j) and i-PP/Versify 3000® in a ratio of 70:30 (2k), measured via AFM/SEM/optimized microscopy.
Figure 2B:
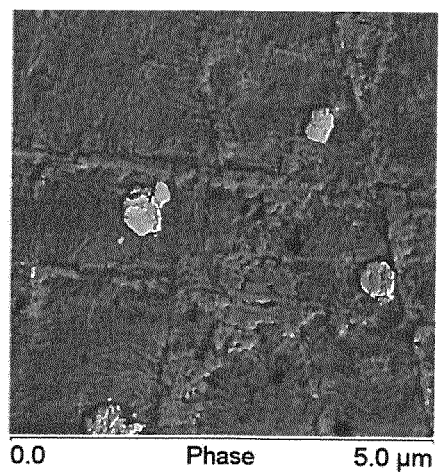
Figure 2C:
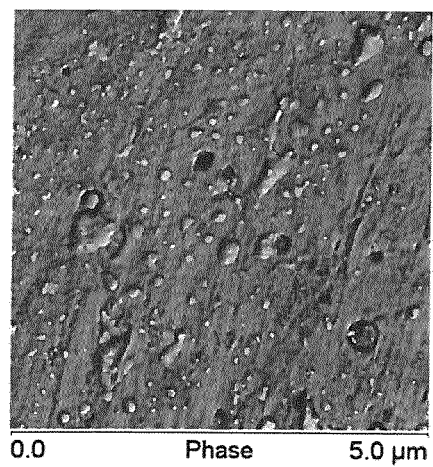
Figure 2D:
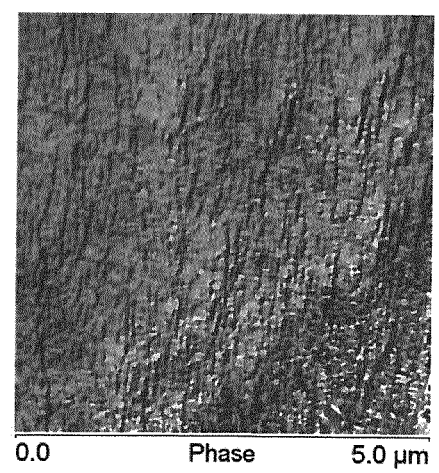
Figure 2E:
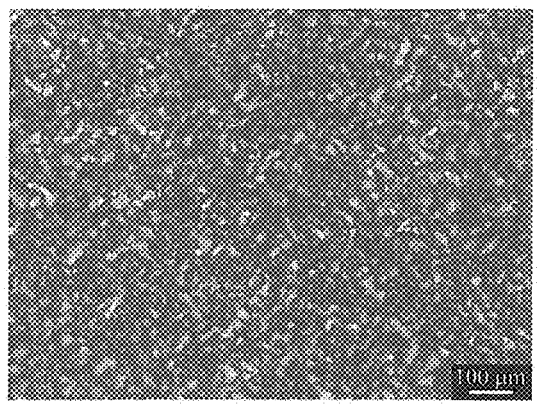
Figure 2F:
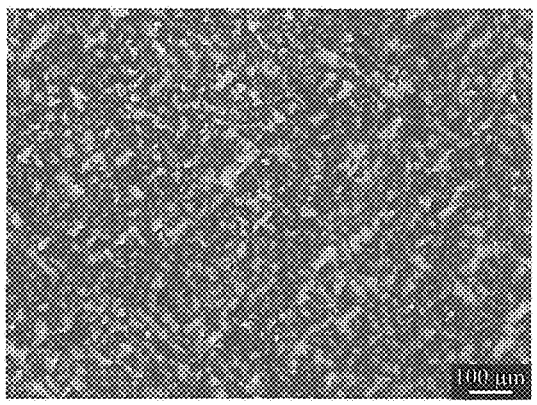
Figure 2G:
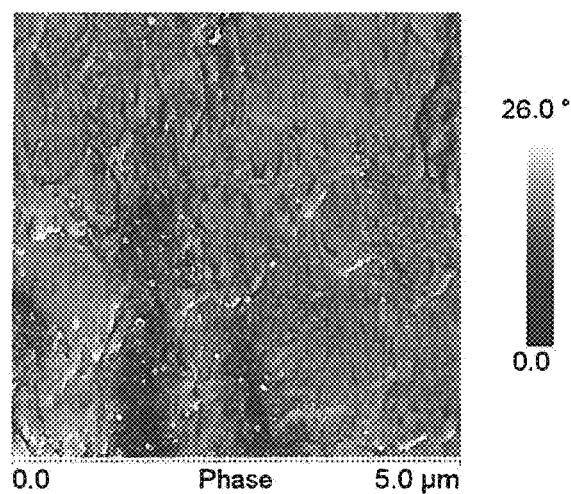
Figure 2H:
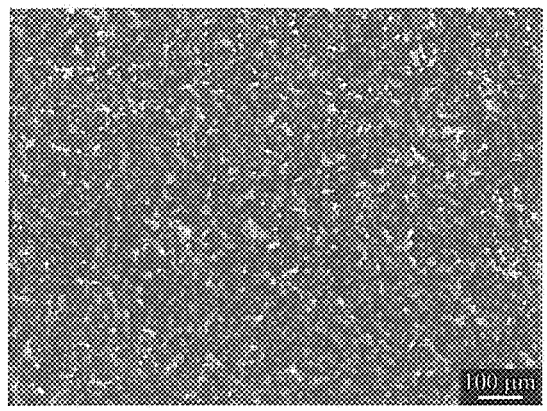
Figure 2I:
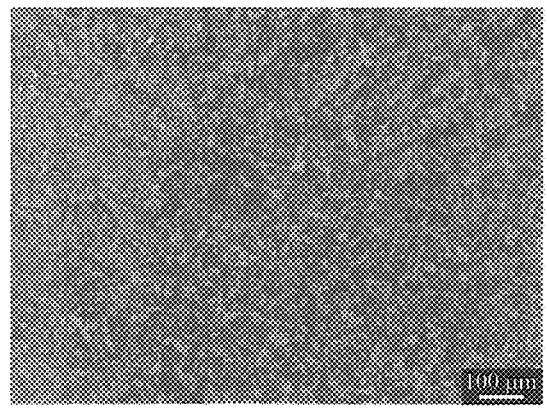
Figure 2J:
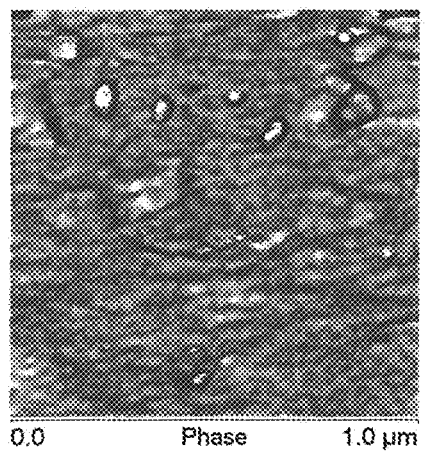
Figure 2K:
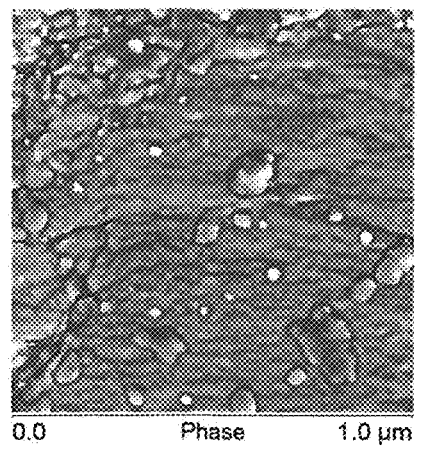
Figure 3C:
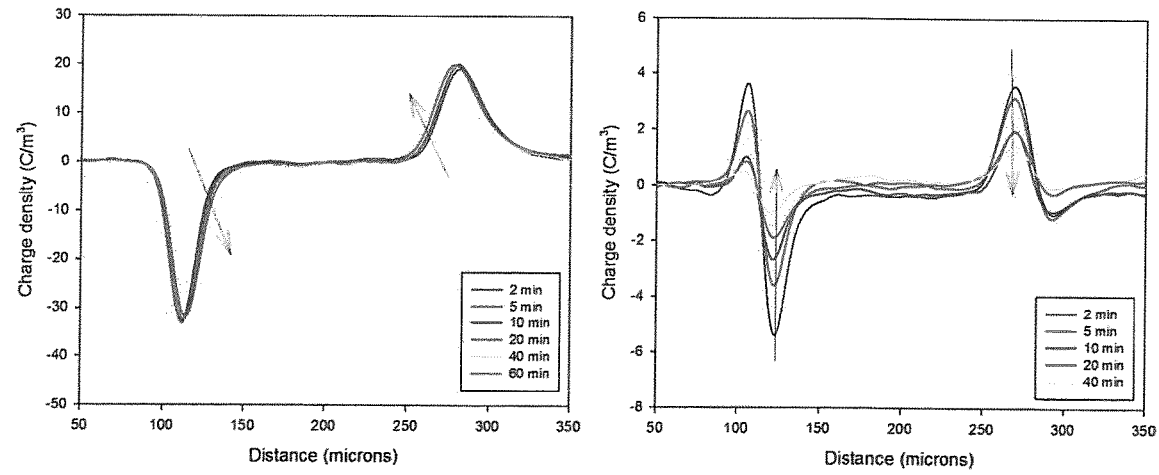
Figure 3D:
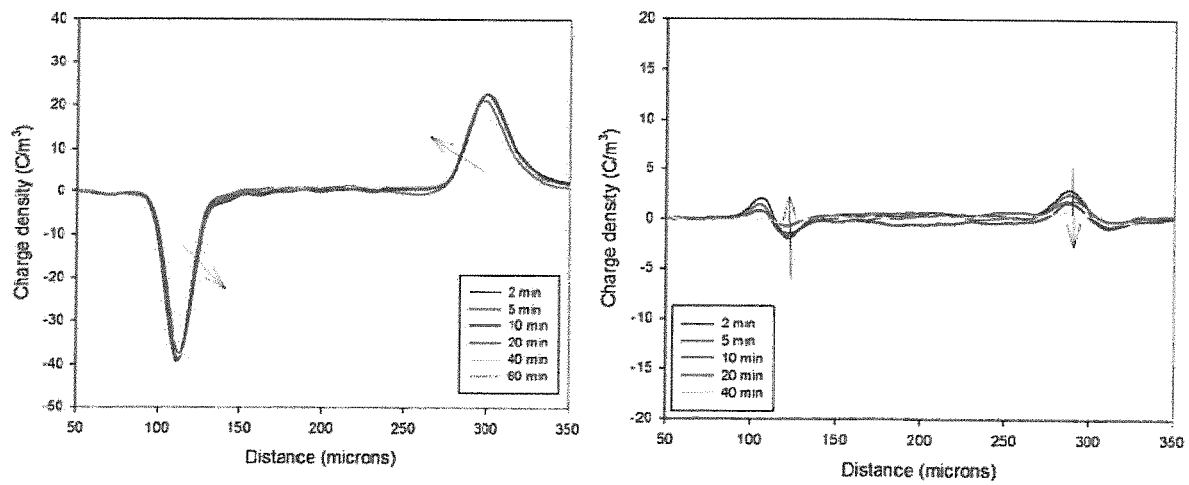
Figure 3E:
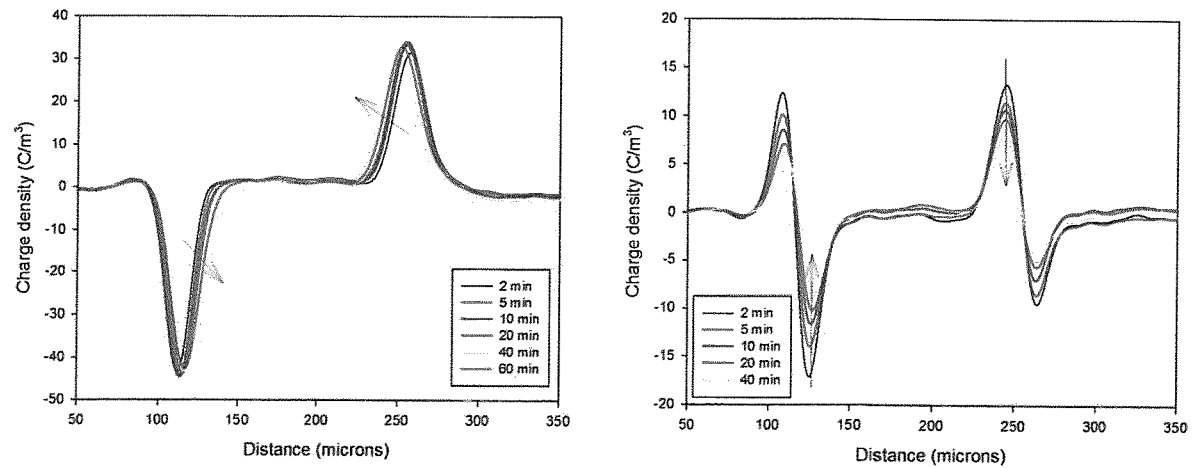
Figure 3F:
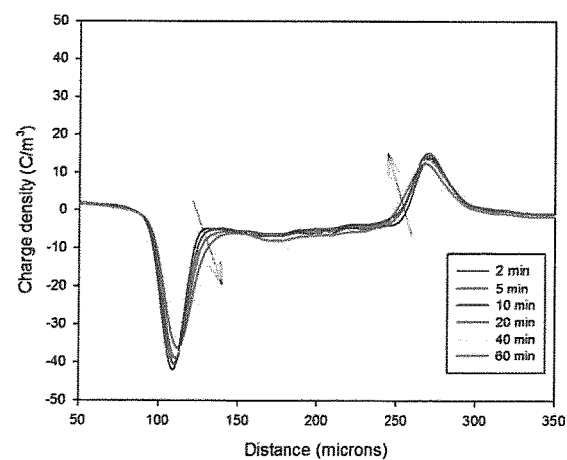

In contrast to commonly used thermoplastic blends, the inventive polymer composition exhibits a very high compatibility of the two applied base components (i.e. first copolymer and copolymer blend) which may lead in fact to a composition with more than two polymers resulting in a highly homogenous material. Therefore, any phase separation as observed widely for other thermoplastic blends (i.e. thermoplastic multi-component mixtures) does not occur in the inventive polymer composition after cooling from molten state due to carefully adjusting the propylene and ethylene content within the first ethylene-propylene copolymer in the above-described ranges. This is clearly demonstrated by FIGS. 2a-2k which show measurements/graphs concerning phase separation occurrence of Tafmer PN3560® (2a), Versify 2200® (2b), Versify 3000® (2c), SC820CF® (2d), SC820CF/Tafmer PN3560® in a ratio of 70:30 (2e-2g), i-PP/Tafmer PN3560® in a ratio of 70:30 (2h-2i), i-PP/Versify 2200® in a ratio of 70:30 (2j) and i-PP/Versify 3000® in a ratio of 70:30 (2k), measured via AFM/SEM/optimized microscopy. In particular, in FIGS. 2e-2g, the polymer composition according to the present invention (i.e. SC820CF/Tafmer PN3560® in a ratio of 70:30) exhibits a highly homogeneous phase (as shown by polarized microscopy) while commonly used thermoplastic blends shown in FIGS. 2j and 2k (i.e. i-PP/Versify 2200® in a ratio of 70:30 and i-PP/Versify 3000® in a ratio of 70:30, respectively) exhibit phase separation in micro scale (as shown by AFM measurements). For instance, in FIG. 2k, separated phases are detectable as distinct spheres separated from the remaining surface of the blend.

The degree of homogeneity throughout the polymer composition can be further improved by carefully adjusting the polymer architecture of the first copolymer, particularly the overall proportion of ethylene-propylene-ethylene (EPE) and propylene-ethylene-propylene (PEP) units as well as the average ethylene block length within the above-described ranges. In this regard, it has been found that the specific polymer architecture of the first copolymer allows perfect co-crystallization with the copolymer blend. In particular, it has been found out that the first copolymer "reinforces" the copolymer blend in that adding the first copolymer to the copolymer blend leads to an increase of the melting point. At the same time, phase separation within the polymer composition does not occur which would be expected when mixing for instance additional i-PP with the copolymer blend.

According to a preferred aspect the polymer composition shows no phase separation occurrence determined via one or more of the above-mentioned techniques at any cooling rate, i.e. at medium-fast cooling and/or slow cooling. In this respect, medium-fast cooling means a cooling rate of higher than 1° C./min, starting from the temperature at which the blend is melted until room temperature. Accordingly, slow cooling means a cooling rate of lower than 1° C./min, starting from the temperature at which the blend is melted until room temperature. In a preferred aspect cooling (fast-medium cooling and/or slow cooling) may be performed under nitrogen atmosphere. According to a preferred aspect the crystallization speeds of the first copolymer and the copolymer blend differ in at most 20%, preferably at most 10% from each other. According to a further preferred aspect the first copolymer and the copolymer blend are miscible in the melt after being mixed and melted at an elevated temperature, preferably at about 170 to 230° C.

Therefore, according to a preferred aspect the polymer composition, produced by mixing
a blend of
    a first copolymer being an ethylene-propylene copolymer comprising from 60 to 95% by weight propylene and from 5 to 40% by weight ethylene, based on the total weight of the first copolymer, and
    a copolymer blend comprising a second copolymer being a butylene-propylene copolymer, wherein
the second copolymer comprises from 15 to 35% by weight 1-butylene and from 30 to 65% by weight propylene, based on the total weight of the second copolymer, and
    optionally further additives,
in a weight ratio of the first copolymer to the copolymer blend ranging from 90:10 to 10:90, at an elevated temperature, preferably at about 170 to 230° C., and
ii) cooling the mixture obtained from step i) at a cooling rate of lower than 10° C./min, preferably lower than 1° C./min, shows no phase separation occurrence determined via AFM/SEM/optimized microscopy.

According to an aspect the polymer composition has a Young's modulus (i.e. elastic modulus) of less than 500 MPa, preferably less than 400 MPa, more preferably less than 350 MPa, typically less than 320 MPa. In a preferred aspect the polymer composition has a Young's modulus (i.e. elastic modulus) of 100 MPa to 500 MPa, more preferably 150 MPa to 400 MPa, most preferably 250 MPa to 350 MPa. The Young's modulus (elastic modulus) is determined according to ISO 527-2 at room temperature (25° C.). In particular, the Young's modulus is determined from the slope of a stress-strain curve created during tensile tests ISO 527-2 conducted on a sample of the polymer composition. According to a preferred aspect, the above Young's modulus is obtained at all temperatures between 10° C. to 80° C.

According to an aspect the polymer composition has a softening temperature of higher than 120° C., preferably higher than 130° C., more preferably higher than 140° C. According to a further aspect the polymer composition has a softening temperature of 120° C. to 180° C., preferably 125° C. to 160° C., more preferably 130° C. to 150° C. The softening temperature is defined as the temperature at which a material softens beyond some arbitrary softness. It can be determined, for instance, by the Vicat method based on ASTM-D1525 (or, in an alternative or additional aspect, based on ISO 306). In particular, the softening temperature is determined via thermal mechanical analysis (TMA) using a quartz probe with a flat tip (1 mm diameter) pressed on a sample (preferably 5×5 mm) with a constant load of 100-5000 mN (preferably 100 mN) and a temperature rate of 0.5 to 10 K/min (preferably 1 K/min) under air environment. During continuous heating of the sample, the quartz probe caves in (penetrates) the sample until the quartz probe reaches the bottom of the sample.

According to an aspect the polymer composition has a steady state conductivity (DC) of less than $1*10^{-12}$ S/m, preferably of less than $2*10^{-13}$ S/m, and more preferably of less than $2.5*10^{-14}$ S/m. In a preferred aspect, the polymer composition has a steady state conductivity (DC) of $1*10^{-15}$ S/m to $1.5*10^{-14}$ S/m, preferably $1.5*10^{-15}$ S/m to $1.0*10^{-14}$ S/m more preferably $2*10^{-15}$ S/m to $5*10^{-15}$ S/m. The steady state conductivity (DC) is determined by applying a three electrode system (40 mm round electrode diameter with guard electrode) and measuring the leakage current with a sensitive picoamperemeter (Keithley 6485) on 1 mm thick plates at 70° C. and 20 kV/mm DC after at least 80 hours.

According to an aspect the polymer composition has an electrical breakdown strength (DC) at room temperature of higher than 300 kV/mm, preferably higher than 350 kV/mm, more preferably higher than 380 kV/mm at any cooling rate. In this respect, electrical breakdown refers to a rapid reduction in the resistance of an electrical insulator that can lead to a spark jumping around or through the insulator. The electrical breakdown strength (DC) is determined according to ASTM D149-87 at room temperature on 0.1 mm thick plates (18×18 cm) manufactured in a hot press and measured in silicone oil using a 100 kV digital HVDC source with a voltage ramping rate of 100 V/s. Thereby, the electrical breakdown strength (DC) is determined after having cooled down the polymer composition at three different cooling rates (i.e. fast, medium or slow cooling). In this regard, fast cooling means a cooling with a rate of larger than 10° C./min. Accordingly, medium cooling means cooling at a rate in a range of 10 to 1° C./min. Slow cooling means a cooling with a rate of less than 1° C./min.

According to an aspect polymer composition has a good space charge behavior. This means that only homo charges are generated in the sample close to the electrodes, that the stored charge density is below 30 C/m$^3$ after charge injection and that exhibit a fast charge decay with 50% of remaining space charge after less than 40 minutes. Space charge behavior is determined on 0.15 mm thickness samples using PEANUTS pulsed electro-accoustic system (5-Lab) applying both a constant DC voltage to the sample as well as a 400 Hz/600 V signal for the measurement of space charge employing a PVDF sensor. FIGS. 3a-3f show measurements/graphs (charging left, decay right) concerning space charge measurements of Versify 2200® (3a), Versify 3000® (3b), SC820CF® (3c), SC820CF/Tafmer PN3560® in a ratio of 70:30 (3d), i-PP/Tafmer PN3560® in a ratio of 70:30 (3e), and i-PP/Versify 2200® in a ratio of 70:30 (3f). Data with respect to Tafmer PN3560® alone as well as i-PP/Versify 3000® in a ratio of 70:30 were not available.

The polymer composition according to the present invention preferably exhibits a linear elasticity limit of higher than 6%, more preferably higher than 10%, most preferably higher than 12% at room temperature, determined according to ISO 527-2.

The polymer composition according to the present invention preferably exhibits a tensile strength of 2 MPa to 30 MPa, more preferably of 5 MPa to 20 MPa, most preferably of 7 MPa to 15 MPa, determined according to ISO 527-2 and ISO 37.

The polymer composition according to the present invention preferably exhibits a dielectric constant at room temperature of less than 2.8, more preferably less than 2.5, most preferably less than 2.3 measured by ASTM D150, IEC 60250.

Another preferred aspect of the invention relates to a cable for low, medium and/or high voltage (HV) as well as for both direct current (DC) or alternating current (AC) transmission or distribution. Said inventive cables preferably comprise a conductor surrounded by an insulation layer of the polymer composition according to the present invention, and are optionally surrounded by a conductive and/or a semi-conductive layer located between the conductor and the inner surface of the insulation layer, and are further optionally surrounded by a jacketing layer covering the outer surface of the insulating layer characterized in that the cable exhibits a value of dielectric loss of less than $10^{-2}$, preferably less than $10^{-3}$, and more preferably of less than $10^{-4}$, determined by ASTM D150 and ASTM D2520.

These cables comprising the insulation layer of the polymer composition according to the present invention have a very low shrinkage, preferably lower than 1.50%, more preferably lower than 1.30%, still more preferably lower than 1.20%, still more preferably lower than 1.10% and most preferably lower than 1.05%.

According to the present invention, shrinkage is measured as distance difference between two marks drawn onto the outer semicon layer before and after annealing of the complete cable core. Shrinkage was determined according to AEIC CS5-94.

Moreover, the sagging determined according to IEC 60840 (1999) should be preferably lower than 20%, more preferably lower than 12%, still more preferably lower than 8%, and most preferably lower than 6%. In addition, it is preferred that both properties of the cables, i.e. shrinkage and sagging, fall simultaneously within the given ranges as defined above.

An example of a cable according to the present invention comprising (from the center moving outwards) is shown in FIG. 1 having the following structure:
- a stranded multi-wire conductor 10;
- a first extruded conductive or semi-conductive shield 11 disposed around and outside the conductor 10 and inside a conductor insulation 12;
- an extruded conductor insulation 12 with an extruded polymer composition according to the present invention;
- a second extruded semi-conductive shield 13 disposed outside the conductor insulation 12;
- a metallic screen 14;
- an outer jacketing layer 15 arranged outside the metallic screen 14.

Another example of a cable according to the present invention comprises (from the center moving outwards) a stranded multi-wire conductor, a first extruded conductive or semi-conductive shield 11 disposed around and outside the conductor 10 and inside a conductor insulation 12, an extruded conductor insulation 12 with an extruded polymer composition according to the present invention, a second extruded semi-conductive shield 13 disposed outside the conductor insulation 12, a metallic screen 14; an outer jacketing layer 15 arranged outside the metallic screen 14.

According to another embodiment of the invention, the invention relates to the use of the polymer composition as an insulating material for an electrical component. In particular, the invention relates to the use of the polymer composition for insulating electrical coils and in the production of electrical components such as transformers, bushings, insulators, switches, sensors, converters, cable end seals and high voltage surge arresters.

According to another embodiment of the invention, the invention relates to the use of the polymer composition according to the present invention for high-voltage insulations for indoor and outdoor use, especially for outdoor insulators associated with high-voltage lines, as long-rod, composite and cap-type insulators, and also for base insulators in the medium-voltage sector, in the production of insulators associated with outdoor power switches, measuring transducers, lead-throughs, and overvoltage protectors, in switchgear construction, in power switches, dry-type transformers, and electrical machines, as coating materials for transistors and other semiconductor elements and/or to impregnate electrical components.

Another aspect of the present invention relates to an insulating material for electrical articles comprising the polymer composition according to the present invention.

Another embodiment of the present invention relates to electrical articles comprising the polymer composition according to the present invention.

In accordance with the present invention, the use of the polymer composition as defined above makes it possible to obtain a recyclable, flexible coating which has excellent mechanical properties, both in terms of the elastic modulus and a high softening temperature.

The polymer composition according to the present invention shows a low elastic modulus of less than 500 MPa and full linear elasticity higher than 8% elongation with no expected plastic deformation and material yielding. Even with such high flexibility, the blends of the specific first copolymer with the copolymer blend (i.e. the polymer composition) exhibit a high softening temperature, inter alia of higher than 120° C., which results in high thermal form-stability.

The mechanical properties mentioned above are accompanied by excellent electrical properties, such as—inter alia—insulation. Thus, the polymer compositions according to the present invention exhibit a high DC breakdown strength of higher than 300 kV/mm at any cooling rate and a very low conductivity of less than 20 fS/m.

According to a further aspect, the present invention also comprises a method for producing a polymer composition, comprising the steps of
i) mixing
a first copolymer being an ethylene-propylene copolymer comprising from 60 to 95% by weight propylene and from 5 to 40% by weight ethylene, based on the total weight of the first copolymer, and
a copolymer blend comprising a second copolymer being a butylene-propylene copolymer, wherein
the second copolymer comprises from 15 to 35% by weight 1-butylene and from 30 to 65% by weight propylene, based on the total weight of the second copolymer, and
optionally further additives,
in a weight ratio of the first copolymer to the copolymer blend ranging from 90:10 to 10:90,
at an elevated temperature, preferably at about 190 to 230° C., and ii) cooling the mixture obtained from step i) at a cooling rate of lower than 10° C./min, preferably lower than 1° C./min.

Optionally, cooling step ii) may also be carried out at a cooling rate of higher than 1° C./min. In a preferred aspect cooling of lower/higher than 1° C./min may be performed under nitrogen atmosphere.

In particular, the blends of all parts of the polymer composition as described herein can be prepared in a mixer such as twin-screw extruder or kneader—for example in a so-called brabender mixer—at an elevated temperature—for example at a temperature of at least 160° C., preferably at about 170 to 230° C. Preferably, mixing is carried out for 1 minute up to 5 hours, more preferably 5 minutes up to 3 hours, most preferably 10 minutes up to 1 hour. This results in a highly homogeneous mixture between all parts of the polymer composition as described and contributes to the prevention of phase separation after cooling the mixture as described above.

The polymer compositions can be prepared by blending the first ethylene-propylene copolymer comprising from 60 to 95% by weight propylene and from 5 to 40% by weight ethylene and the copolymer blend in a weight ratio of the first ethylene-propylene copolymer to the copolymer blend ranging from 90:10 to 10:90 according to methods from the state of the art. In this respect, the copolymer blend comprises 10 to 99.99% by weight of a second copolymer having from 15 to 35% by weight 1-butylene and from 30 to 65% by weight propylene, said second copolymer optionally further comprises from 15 to 35% by weight ethylene, wherein the copolymer blend further optionally comprises 0.01 to 90% by weight of isotactic propylene (i-PP).

According to an alternative aspect the polymer compositions can also be prepared by blending (i.e. adding) each of the components separately, i.e. blending the first copolymer comprising from 60 to 95% by weight propylene and from 5 to 40% by weight ethylene and the second copolymer comprising a butylene-propylene copolymer having from 15 to 35% by weight 1-butylene and from 30 to 65% by weight propylene and optionally, from 15 to 35% by weight ethylene, and further optionally blending an isotactic propylene (i-PP) in a weight ratio so that the above-mentioned weight ranges of each component within the polymer composition are fulfilled.

Ethylene-propylene copolymers and copolymer blends are commercially available. A great number of various ethylene-propylene copolymers are defined under product names. Kraton®, SC820CF®, Dynaflex® etc. can be used in the compositions according to all embodiments. A typical first copolymer which can be used according to the present invention comprises about 87% by weight propylene with propylene blocks of 8.2 monomer units on average, and about 13% by weight ethylene with short ethylene blocks of 1.2 monomer units on average. A great number of various copolymer blends are defined under product names such as Tafmer PN3560®. A typical copolymer blend which can be used according to the present invention comprises about 85% by weight of a terpolymer comprising 1-butylene, propylene and ethylene with butylene blocks of 1.5 monomer units on average between propylene sequences and ethylene blocks of 1.4 monomer units on average between propylene sequences, and 15% by weight of an isotactic propylene polymer.

In a preferred aspect of the present invention, the polymer compositions may comprise a micro- and nano-reinforcing material, preferably nano-oxides, nano-silicates, nano-clays, and combination of thereof. Examples of such compounds are aluminum oxide, magnesium oxide, aluminosilicates, silicon oxide, zink oxide, etc. Suitable diameters and length of such reinforcement should be in the nanometer scale from 1 nm-5000 nm.

According to a preferred aspect of the invention, the polymer composition may additionally comprise a fiber reinforcing material, preferably continuous mineral or organic fibers, more preferably glass fibers and ceramic fibers, most preferably mineral fibers from aluminum oxide fibers, basalt fibers and glass fibers or aramide fibers and polyester fibers. These fibers may be present in the inventive polymer composition in an amount of up to 5% by weight, preferably, up to 3% by weight, more preferably up to 1% by weight, based on the total weight of the polymer composition.

Depending on the type of the electrical insulator to be produced, the polymer composition may further contain optional additives selected from filler materials, wetting/dispersing agents, plasticizers, antioxidants, light absorbers, processing co-adjuvants, lubricants and pigments, as well as further additives used in electrical applications. These additives generally may be present in the inventive polymer composition in an amount of less than 25% by weight, preferably, less than 5% by weight, more preferably less than 1% by weight, based on the total weight of the polymer composition. Such additives are, for instance, antioxidants such as polymerized trimethyldihydroquinoline, 4,4'-thiobis (3-methyl-6-tert-butyl)phenol; pentaerythryl tetra[3-(3,5-di-tertbutyl-4-hydroxyphenyl)propionate], 2,2'-thiodiethylene-bis-[3-(3,5-ditertbutyl-4-hy-droxyphenyl)propionate] and the like, or mixtures thereof. Such antioxidants are commercially available, for example, under the product name Iganox®, Santonox® as well as the other additives—such as filler materials.

Examples of filler materials are inorganic fillers such as silica and aluminum trihydrate ($Al_2O_3 \cdot 3H_2O$), glass powder, chopped glass fibers, metal oxides such as silicon oxide (e.g. Aerosil, quartz, fine quartz powder) metal hydroxides, metal nitrides, metal carbides, natural and synthetic silicates or mixtures thereof. Aluminum trihydrate or silicon oxide (e.g. Aerosil, quartz, fine quartz powder) are particularly preferred as inorganic filler material. Also, the average particle size distribution of such fillers and their quantity present within the polymer composition corresponds to that average particle size distribution and quantity usually applied in electrical high voltage insulators.

Examples of suitable metals for metal oxides, metal hydroxide, metal nitrides or metal carbides are aluminum, bismuth, cobalt, iron, magnesium, titanium, zinc, or mixtures thereof.

One or more inorganic oxides or salts such as CoO, $TiO_2$, $Sb_2O_3$, ZnO, $Fe_2O_3$, $CaCO_3$ or mixtures thereof, may advantageously be added to the inventive polymer composition in minor amounts, generally in amounts of less than 25% by weight.

Preferably, the above-mentioned metal hydroxides—in particular magnesium and aluminum hydroxides—are used in the form of particles having sizes which can range from 0.1 to 100 µm, preferably from 0.5 to 10 µm. In the case of hydroxides, these can advantageously be used in the form of coated particles. Saturated or unsaturated fatty acids containing from 8 to 24 carbon atoms, and metal salts thereof are usually used as coating materials, such as, for example: oleic acid, palmitic acid, stearic acid, isostearic acid, lauric acid, magnesium or zinc stearate or oleate, and the like.

The amount of inorganic filler which is for example suitable for imparting flame-retardant properties may vary within a wide range, generally between 10 and 80% by weight, preferably between 30 and 70% by weight, relative to the total weight of the composition.

According to a preferred aspect of the present invention, the polymer composition is (semi-) conductive. This means that the polymer composition is used for non-insulating purposes. The conductive or semi-conductive composition is, according to a particular aspect, used as a cable jacket layer adjacent to an inner or outer layer of the cable insulation. Thereby, the layer may improve the interface between the insulation layer and the conductor or the outside. In case the polymer composition according to the present invention is semi-conductive, the polymer composition has an electrical conductivity between that of a conductor and an insulator and has a conductivity (at 25° C.) in a range of $10^{-8}$ to $10^{6}$ S/m, preferably $10^{-7}$ to $10^{5}$ S/m, more preferably $10^{-6}$ to $10^{5}$ S/m, most preferably $10^{-4}$ to $10^{4}$ S/m. In case the polymer composition according to the present invention is conductive, the polymer composition has a conductivity of (at 25° C.) higher than $10^{5}$ S/m, preferably higher than $10^{6}$ S/m. According to another preferred aspect of the present invention, the polymer composition contains a conductive filler such as carbon black and/or is conductive or semi-conductive preferably having an electrical conductivity in the above-defined ranges. According to a preferred aspect of the present invention, the conductive filler may be present in the inventive polymer composition in an amount of up to 10% by weight, preferably, up to 5% by weight, more preferably up to 1% by weight, based on the total weight of the polymer composition. According to an aspect of the invention, a (semi-) conductive polymer composition may comprise a material according to the invention and conductive fillers such as carbon black exhibits a conductivity of higher than $10^{5}$ S/m, preferably higher than $10^{6}$ S/m at 25° C. According to another aspect of the invention a cable according to the invention may have a semi-conductive layer comprising a semi-conductive polymer composition comprising a material according to the invention and conductive fillers such as carbon black exhibits a conductivity of higher than $10^{5}$ S/m, preferably higher than $10^{6}$ S/m at 25° C.

Moreover, the invention is directed to a cable for low, medium and/or high voltage (HV) as well as for both direct current (DC) or alternating current (AC) transmission or distribution comprising a conductor surrounded by an insulation layer of the polymer composition.

Moreover, the conductor can be surrounded by one or more inner conductive and/or semiconductive layer(s) comprising a specific conductive and/or semiconductive composition, an insulation layer comprising the polymer composition according to the invention and optionally a jacketing layer. According to another embodiment, the invention is directed to a cable, said cable comprising a conductor surrounded by at least an inner semiconductive layer comprising a first semiconductive composition, an insulation layer comprising the polymer composition of the present invention, an outer semiconductive layer comprising a second semiconductive composition and optionally a jacketing. The insulation layer comprising the polymer composition of the present invention preferably has a thickness of more than 10 mm, preferably 10 to 50 mm, more preferably 12 to 40 mm, most preferably 15 to 25 mm.

In a preferred aspect of the invention, the cable for direct current (DC) or alternating current (AC) low, medium and/or high voltage power transmission or distribution comprises a conductor surrounded by an insulation layer of the polymer composition according to the present invention, preferably wherein at least one of the following features ($a_1$) to ($a_3$) is met:

($a_1$) a conductive layer is located between the conductor and the inner surface of the insulation layer, ($a_2$) a semi-conductive layer, preferably being located between the conductor and the inner surface of the insulation layer, ($a_3$) a jacketing layer covers at least one of the preceding conductive layer, insulation layer and/or semi-conductive layer.

The semi-conductive layer $a_2$ may exhibit a conductivity of higher than $10^{-8}$ S/m, preferably higher than $10^{-4}$ S/m at 25° C.

The term "conductor" means herein that the conductor comprises one or more wires. Moreover, the cable may comprise one or more such conductors. Preferably the conductor is an electrical conductor and comprises one or more metal wires.

Another aspect of the invention relates to an electrical article comprising the cable according to the invention.

The present invention shall be described in more detail in the following Examples.

EXAMPLES

In the following experiments, thermoplastic polymer compositions (Example 1 and Comparative Examples 1 and 2) as well as several neat polymers/copolymers and copolymer blends (Comparative Examples 3 to 6) were analyzed by specific material parameters as described in details in the following.

Thermoplastic polymer compositions comprising a first copolymer and a copolymer blend were formulated by use of a lab twin-screw extruder. Based on these polymer compositions, plate samples (18×18 cm) of 1, 2 and 4 mm thickness were manufactured in a hot press.

Example 1

A first copolymer (SC820CF® from Borealis) was mixed with a copolymer blend (Tafmer PN3560® (Mitsui Chemicals) in a weight ratio of 70:30.

The first copolymer (SC820CF® from Borealis) and the polymer blend (Tafmer PN3560® from Mitsui Chemicals) used in Example 1 were characterized as follows:

The polymer architectures of SC820CF® and Tafmer PN3560® were proven by $^{13}$C-NMR (samples were dissolved in 1,2,4-trichloro benzene (TCB) and tetrachloro ethylene D6 (TCE-d6) and measured at 120° C.). For comparative purposes, the polymer architectures of Versify 2200® and Versify 3000® were also determined according to the above-mentioned method.

The molecular weights of SC820CF® and Tafmer PN3560® were measured via high temperature gel permeation chromatography (HT-GPC) at 150° C. using 1,2,4-trichloro benzene (TCB) as eluent and polystyrene as calibration standards.

The degrees of crystallinity of SC820CF® and Tafmer PN3560® were determined as ratio of the measured melting enthalpy (via DSC) and the theoretical melting enthalpy of a perfect i-PP crystal (=207.1 J/g).

The results of these tests are shown in Tables 1-4 below:

TABLE 1

Polymer architecture of SC820CF ®, Versify 2200 ® and Versify 3000 ® via $^{13}$C-NMR

| | | SC820CF ® | Versify 2200 ® | Versify 3000 ® |
|---|---|---|---|---|
| Overall ethylene (E) content | | 13% | 11% | 10% |
| Overall propylene (P) content | | 87% | 89% | 90% |
| Average propylene block length | | 8.2 | 11.5 | 12.0 |
| Average ethylene block length | | 1.2 | 1.6 | 2.0 |
| Distribution of triades | EPE | 7% | 2% | 1% |
| | PEP | 8% | 5% | 4% |

TABLE 2

Polymer architecture of components in Tafmer PN3560 ® via $^{13}$C-NMR

| | | Terpolymer | i-PP |
|---|---|---|---|
| Overall butylene (B) content | | 27% | — |
| Overall propylene (P) content | | 49% | 100% |
| Overall ethylene (E) content | | 24% | — |
| Average butylene block length between propylene sequences | | 1.5 | — |
| Average ethylene block length between propylene sequences | | 1.4 | — |
| Distribution of triades | EPE | 1.7% | — |
| | PEP | 10.5% | — |
| | BPB | 23.5% | — |
| | PBP | 2.4% | — |

TABLE 3

Molecular weight via GPC

| | SC820CF ® | Tafmer PN3560 ® |
|---|---|---|
| $M_n$ [g/mol] | 67'800 | 163'000 |
| $M_w$ [g/mol] | 222'000 | 405'000 |
| $M_z$ [g/mol] | 535'000 | 777'000 |
| PD = $M_w/M_n$ | 3.3 | 2.5 |

TABLE 4

Crystallinity as determined by DSC

| | SC820CF ® | Tafmer PN3560 ® |
|---|---|---|
| Crystallinity | 24% | 1% |

Comparative Example 1

An isotactic propylene polymer (HC300BF® from Borealis, i.e. i-PP with Melt Flow Rate (MFR) of 3.3 g/10 min (ISO 1133)) was mixed with a standard ethylene-propylene copolymer (Versify 2200® from Dow) in a weight ratio of 70:30. Comparative Example 1 does not fall under the subject-matter of the present invention due to the fact that no combination of a first copolymer and a copolymer blend is used.

Comparative Example 2

An isotactic propylene polymer (HC300BF® from Borealis, i.e. i-PP with Melt Flow Rate (MFR) of 3.3 g/10 min (ISO 1133)) was mixed with a standard ethylene-propylene copolymer (Versify 3000® from Dow) in a weight ratio of 70:30. Comparative Example 2 does not fall under the subject-matter of the present invention due to the fact that no combination of a first copolymer and a copolymer blend is used.

Comparative Example 3

An isotactic propylene polymer (HC300BF® from Borealis, i.e. i-PP with Melt Flow Rate (MFR) of 3.3 g/10 min (ISO 1133)) was mixed with a specific copolymer blend Tafmer PN3560® from Mitsui in a weight ratio of 70:30. Comparative Example 3 does not fall under the subject-matter of the present invention due to the fact that no combination of a first copolymer and a copolymer blend is used.

Comparative Example 4

A specific ethylene-propylene copolymer SC820CF® from Borealis was used. Comparative Example 4 does not fall under the subject-matter of the present invention due to the fact that no combination of a first copolymer and a copolymer blend is used.

Comparative Example 5

A copolymer blend Tafmer PN3560® from Mitsui is used Comparative Example 3 does not fall under the subject-matter of the present invention due to the fact that no combination of a first copolymer and a copolymer blend is used.

Comparative Example 6

A standard ethylene-propylene copolymer Versify 2200® from Dow was used. Comparative Example 5 does not fall under the subject-matter of the present invention due to the fact that no combination of a first copolymer and a copolymer blend is used.

Comparative Example 7

A standard ethylene-propylene copolymer Versify 3000® from Dow was used. Comparative Example 6 does not fall under the subject-matter of the present invention due to the fact that no combination of a first ethylene-propylene copolymer and a copolymer blend is used.

The following tests were performed with regard to each of the plate samples obtained from the thermoplastic polymer compositions (i.e. Example 1 and Comparative Examples 1, 2 and 3) as well as with regard to plate samples obtained from neat polymers/copolymer (i.e. Comparative Examples 4 to 7):

The morphology and phase separation occurrence in the blends were observed with visual inspection, polarized microscopy, atomic force microscopy (AFM) and scanning electron microscopy (SEM).

Mechanical properties were determined by tensile tests at room temperature according to ISO 527-0.2

The melting/softening temperature was determined via thermal mechanical analysis (TMA) using a quartz probe with a flat tip (1 mm diameter) pressed on the sample with a constant load of 100 mN and a temperature rate of 1 K/min.

DC conductivity was determined at 70° C. and 20 kV/mm on 1 mm thick plates.

DC breakdown strength determined according to ASTM D149-87 on 0.1 mm thick plates and measured in silicone oil using a 100 kV HVDC source with a voltage ramping rate of 100 V/s.

Space charge measurements were performed on 0.15 mm thickness samples using a PEANUTS pulsed electro-acoustic system (5-Lab) applying both a constant DC voltage to the sample as well as a 400 Hz/600 V signal for the measurement of space charge and employing a PVDF sensor.

The results of these tests are shown in Tables 5-10 below:

TABLE 5

Phase separation occurrence via AFM/SEM/optimized microscopy

| Material | Medium-fast cooling (>1° C./min) | Slow cooling (<1° C./min) |
|---|---|---|
| Example 1 (SC820CF ®/Tafmer PN3560 ® with ratio 70:30) | no | no |
| Comparative Example 1 (i-PP/Versify 2200 ® with ratio 70:30) | yes | yes |
| Comparative Example 2 (i-PP/Versify 3000 ® with ratio 70:30) | yes | yes |
| Comparative Example 3 (i-PP/Tafmer PN3560 ® with ratio 70:30) | no | yes |
| Comparative Example 4 (SC820CF ®) | no | no |
| Comparative Example 5 (Tafmer PN3560 ®) | no | no |
| Comparative Example 6 (Versify 2200 ®) | yes | yes |
| Comparative Example 7 (Versify 3000 ®) | yes | yes |

TABLE 6

Tensile properties

| Material | Young's modulus |
|---|---|
| Example 1 (SC820CF ®/Tafmer PN3560 ® with ratio 70:30) | 296 MPa |
| Comparative Example 1 (i-PP/Versify 2200 ® with ratio 70:30) | 600 MPa |
| Comparative Example 2 (i-PP/Versify 3000 ® with ratio 70:30) | 700 MPa |
| Comparative Example 3 (i-PP/Tafmer PN3560 ® with ratio 70:30) | 400 MPa |
| Comparative Example 4 (SC820CF ®) | 550 MPa |
| Comparative Example 5 (Tafmer PN3560 ®) | 9 MPa |
| Comparative Example 6 (Versify 2200 ®) | 100 MPa |
| Comparative Example 7 (Versify 3000) ® | 390 MPa |

TABLE 7

Softening/melting temperature

| Material | Onset of softening |
|---|---|
| Example 1 (SC820CF/Tafmer PN3560 ® with ratio 70:30) | 144° C. |
| Comparative Example 1 (i-PP/Versify 2200 ® with ratio 70:30) | 166° C. |
| Comparative Example 2 (i-PP/Versify 3000 ® with ratio 70:30) | 166° C. |
| Comparative Example 3 (i-PP/Tafmer PN3560 ® with ratio 70:30) | 167° C. |
| Comparative Example 4 (SC820CF ®) | 144° C. |
| Comparative Example 5 (Tafmer PN3560 ®) | 142° C. |
| Comparative Example 6 (Versify 2200 ®) | 98° C. |
| Comparative Example 7 (Versify 3000 ®) | 127° C. |

TABLE 8

DC conductivity on 1 mm plate samples

| Material | DC conductivity at 20 kV/mm - 70° C. |
|---|---|
| Example 1 (SC820CF ®/Tafmer PN3560 ® with ratio 70:30) | 4 fS/m |
| Comparative Example 1 (i-PP/Versify 2200 ® with ratio 70:30) | Not measurable - breakdown occurred |
| Comparative Example 2 (i-PP/Versify 3000 ® with ratio 70:30) | Not measurable - breakdown occurred |
| Comparative Example 3 (i-PP/Tafmer PN3560 ® with ratio 70:30) | 7 fS/m |
| Comparative Example 4 (SC820CF ®) | 3 fS/m |
| Comparative Example 5 (Tafmer PN3560 ®) | 142 fS/m |
| Comparative Example 6 (Versify 2200 ®) | Not measurable - breakdown occurred |
| Comparative Example 7 (Versify 3000 ®) | Not measurable - breakdown occurred |

TABLE 9

DC breakdown strength on 0.1 mm plate samples

| Material | Cooling | Eo (kV/mm) | P |
|---|---|---|---|
| Example 1 (SC820CF ®/Tafmer PN3560 ® with ratio 70:30) | Fast | 454 | 7.9 |
| | Medium | 469 | 6.7 |
| | Slow | 392 | 8.8 |
| Comparative Example 1 (i-PP/Versify 2200 ® with ratio 70:30) | Fast | 333 | 12.3 |
| | Medium | 340 | 14.7 |
| | Slow | 346 | 9.2 |
| Comparative Example 2 (i-PP/Versify 3000 ® with ratio 70:30) | | not measurable | |
| Comparative Example 3 (i-PP/Tafmer PN3560 ® with ratio 70:30) | Fast | 470 | 7.0 |
| | Medium | 463 | 5.5 |
| | Slow | 269 | 3.8 |
| Comparative Example 4 (SC820CF ®) | Fast | 434 | 10.7 |
| | Medium | 454 | 7.4 |
| | Slow | 466 | 7.3 |
| Comparative Example 5 (Tafmer PN3560 ®) | | not measurable | |
| Comparative Example 6 (Versify 2200 ®) | Fast | 311 | 8.1 |
| | Medium | 321 | 8.7 |
| | Slow | 327 | 5.7 |
| Comparative Example 7 (Versify 3000 ®) | Fast | 185 | 7.0 |
| | Medium | 192 | 6.8 |
| | Slow | 198 | 6.5 |

TABLE 10

Space charge

| Material | Evaluation |
|---|---|
| Example 1 (SC820CF ®/Tafmer PN3560 ® with ratio 70:30) | Good space charge behaviour: Homo-charge, little charge storage, fast charge decay |
| Comparative Example 1 (i-PP/Versify 2200 ® with ratio 70:30) | Bad space charge behaviour: Homo-charge, but substantial evidence of a negative charge being stored within the bulk |
| Comparative Example 2 (i-PP/Versify 3000 ® with ratio 70:30) | not available |
| Comparative Example 3 (i-PP/Tafmer PN3560 ® with ratio 70:30) | Good space charge behaviour: Homo-charge, little charge storage, fast charge decay |
| Comparative Example 4 (SC820CF ®) | Good space charge behaviour: Homo-charge, little charge storage, fast charge decay |
| Comparative Example 5 (Tafmer PN3560 ®) | Not available |
| Comparative Example 6 (Versify 2200 ®) | Bad space charge behaviour: Significant positive hetero-charge storage adjacent to the cathode and tendency to store positive charge in the bulk of the sample |
| Comparative Example 7 (Versify 3000 ®) | not available |

Results:

The specific polymer compositions according to the present invention (Example 1) show no phase separation and therefore a highly homogenous distribution which is explained in more detail in the description above. Moreover, specific polymer compositions according to the present invention show low elastic modulus of <400 MPa and therefore sufficient elasticity with no expected plastic deformation and material yielding (linear elasticity limit of 14-16%). At the same time—even with such high flexibility—polymer compositions according to the present invention exhibit high melting temperature of >140° C. and therefore high thermal form-stability. Furthermore, polymer compositions according to the present invention exhibit high DC breakdown strength of >380 kV/mm due to the prevention of phase separation, as well as very low conductivity of <20 fS/m due to unneeded additives and therefore the absence of polar species as it is the case for cross-linked polyethylene.

In view of the above, the polymer composition according to the present invention stands out with superior mechanical and electrical properties, such as high thermal form-stability and mechanical flexibility, as well as low conductivity and high electric breakdown strength and is highly usable for insulation of electric cables, in particular HV cables, in particular for HV DC cables.

The invention claimed is:

1. A polymer composition comprising:
   a first copolymer being an ethylene-propylene copolymer comprising from 60 to 95% by weight propylene and from 5 to 40% by weight ethylene, based on the total weight of the first copolymer; and
   a copolymer blend comprising a second copolymer being a butylene-propylene-ethylene copolymer,
   wherein the second copolymer comprises from 15 to 35% by weight 1-butylene, 15 to 35% by weight ethylene, and from 30 to 65% by weight propylene, based on the total weight of the second copolymer,
   wherein the weight ratio of the first copolymer to the copolymer blend ranges from 20:80 to 50:50,
   wherein the polymer composition has a softening temperature according to the Vicat method based on ASTM-D1525 of more than 120° C. and a Young's modulus determined according to ISO 527-2 of less than 500 MPa,
   wherein the polymer composition has DC electrical breakdown strength at room temperature determined according to ASTM D149-87 of higher than 300 kV/mm, and
   wherein the polymer composition excludes filler material and light absorbers.

2. The polymer composition according to claim 1, wherein the polymer composition shows no phase separation occurrence determined via visual inspection, polarized microscopy, atomic force microscopy (AFM) and scanning electron microscopy (SEM).

3. The polymer composition according to claim 1, wherein the polymer composition has a steady state conductivity (DC) at 70° C. and 20 kV/mm on 1 mm thick plates after at least 80 hours of less than $1*10^{-12}$ S/m.

4. The polymer composition according to claim 1, wherein the polymer composition exhibits a linear elasticity limit of higher than 6%, determined according to ISO 527-2.

5. The polymer composition according to claim 1, wherein the polymer composition exhibits a dielectric constant at room temperature of less than 2.8, measured by ASTM D150, IEC 60250.

6. The polymer composition according to claim 1, wherein the polymer composition has a softening temperature according to the Vicat method based on ASTM-D1525 of more than 140° C.

7. The polymer composition according to claim 1, wherein the polymer composition has a Young's modulus determined according to ISO 527-2 of less than 400 MPa.

8. The polymer composition according to claim 1, wherein the first copolymer has an average ethylene block length of 1.0 to 1.5 monomer units.

9. The polymer composition according to claim 1, wherein the first copolymer has an average propylene block length of 5.0 to 10.0 monomer units.

10. The polymer composition according to claim 1, wherein the first copolymer has a proportion of ethylene-propylene-ethylene triades of 4% to 20% based on the total number of triades present in the first copolymer.

11. The polymer composition according to claim 1, wherein the first copolymer has a proportion of propylene-ethylene-propylene triades of 6% to 20% based on the total number of triades present in the first copolymer.

12. The polymer composition according to claim 1, wherein the first copolymer has an overall proportion ethylene-propylene-ethylene (EPE) and propylene-ethylene-propylene (PEP) units of 10 to 20% by weight on average, based on the total number of triades present in the first copolymer.

13. The polymer composition according to claim 1, wherein the first copolymer has a proportion of propylene-propylene diades of 60% to 79% based on the total number of diades present in the first copolymer.

14. The polymer composition according to claim 1, wherein the first copolymer has a proportion of ethylene-propylene diades of 16% to 30% based on the total number of diades present in the first copolymer.

15. The polymer composition according to claim 1, wherein the first copolymer has a proportion of ethylene-ethylene diades of 1% to 4.5% based on the total number of diades present in the first copolymer.

16. The polymer composition according to claim 1, wherein the first copolymer has a proportion of polypropylene-polypropylene-polypropylene triades of 50% to 70% based on the total number of triades present in the first copolymer.

17. The polymer composition according to claim 1, wherein the first copolymer has a proportion of propylene-propylene-ethylene triades of 12% to 25% based on the total number of triades present in the first copolymer.

18. The polymer composition according to claim 1, wherein the first copolymer has a proportion of ethylene-ethylene-ethylene triades of 0.1% to 2% based on the total number of triades present in the first copolymer.

19. The polymer composition according to claim 1, wherein the copolymer blend further comprises from 0.01 to 90% by weight of an isotactic propylene polymer (i-PP).

20. A cable for direct current (DC) or alternating current (AC) medium and/or high voltage power transmission or distribution comprising a conductor surrounded by an insulation layer of the polymer composition according to claim 1.

21. The cable according claim 20, wherein at least one of the following features ($a_1$) to ($a_3$) is met:
  ($a_1$) a conductive layer is located between the conductor and the inner surface of the insulation layer,
  ($a_2$) a semi-conductive layer is present in the cable,
  ($a_3$) a jacketing layer covers at least one of the conductive layer, insulation layer and/or semi-conductive layer.

22. The cable according to claim 21, wherein the semi-conductive layer ($a_2$) exhibits a conductivity of higher than $10^{-8}$ S/m.

23. The cable according to claim 20, wherein the insulation layer has a thickness of more than 10 mm.

24. An electrical article comprising the cable according to claim 20.

25. The cable according to claim 20, wherein a semi-conductive layer is present in the cable, the semi-conductive layer comprising a (semi-)conductive polymer composition comprising:
  a first copolymer being an ethylene-propylene copolymer comprising from 60 to 95% by weight propylene and from 5 to 40% by weight ethylene, based on the total weight of the first copolymer; and
  a copolymer blend comprising a second copolymer being a butylene-propylene-ethylene copolymer,
  wherein the second copolymer comprises from 15 to 35% by weight 1-butylene, 15 to 35% by weight ethylene, and from 30 to 65% by weight propylene, based on the total weight of the second copolymer,
  wherein the weight ratio of the first copolymer to the copolymer blend ranges from 20:80 to 50:50,
  wherein the polymer composition has a softening temperature according to the Vicat method based on ASTM-D1525 of more than 120° C. and a Young's modulus determined according to ISO 527-2 of less than 500 MPa, and
  wherein the polymer composition has DC electrical breakdown strength at room temperature determined according to ASTM D149-87 of higher than 300 kV/mm; and
  conductive fillers exhibiting a conductivity of higher than $10^5$ S/m.

26. An insulating material for electrical articles comprising the polymer composition according to claim 1.

27. An electrical article comprising the polymer composition according to claim 1.

28. A (semi-)conductive polymer composition comprising a material according to claim 1 and conductive fillers exhibiting a conductivity of higher than $10^5$ S/m.

29. The polymer composition according to claim 1, wherein the first copolymer is non-cross-linked.

30. A method for producing a polymer composition, comprising the steps of
  i) mixing
  a first copolymer being an ethylene-propylene copolymer comprising from 60 to 95% by weight propylene and from 5 to 40% by weight ethylene, based on the total weight of the first copolymer, and
  a copolymer blend comprising a second copolymer being a butylene-propylene-ethylene copolymer, wherein
  the second copolymer comprises from 15 to 35% by weight 1-butylene, 15 to 35% by weight ethylene, and from 30 to 65% by weight propylene, based on the total weight of the second copolymer, and
  optionally further additives,
  in a weight ratio of the first copolymer to the polymer blend ranging from 20:80 to 50:50,
  at an elevated temperature, and
  ii) cooling the mixture obtained from step i) at a cooling rate of lower than 10° C./min; wherein the polymer composition has a softening temperature according to the Vicat method based on ASTM-D1525 of more than 120° C. and a Young's modulus determined according to ISO 527-2 of less than 500 MPa, wherein the polymer composition has DC electrical breakdown strength at room temperature determined according to ASTM D149-87 of higher than 300 kV/mm; and
  wherein the polymer composition excludes filler material and light absorbers.

* * * * *

UNITED STATES PATENT AND TRADEMARK OFFICE
CERTIFICATE OF CORRECTION

PATENT NO. : 10,662,323 B2
APPLICATION NO. : 14/911674
DATED : May 26, 2020
INVENTOR(S) : Chau-Hon Ho et al.

Page 1 of 1

It is certified that error appears in the above-identified patent and that said Letters Patent is hereby corrected as shown below:

On the Title Page

Item (71) Applicant please replace "NKT HV CABLES AB, Lyckeby (CH)" with --NKT HV CABLES AB, Lyckeby (SE)--.

Signed and Sealed this
Seventeenth Day of November, 2020

Andrei Iancu
*Director of the United States Patent and Trademark Office*